United States Patent
Hasskerl et al.

(10) Patent No.: US 9,399,335 B2
(45) Date of Patent: Jul. 26, 2016

(54) ADHESIVE FOR PRODUCING COMPOSITE BODIES, A PLASTIC GLASS COMPOSITE OR COMPOSITE GLASS FOR ARCHITECTURE AND CONSTRUCTION

(71) Applicants: Thomas Hasskerl, Kronberg (DE); Klaus Koralewski, Riedstadt (DE); Sabine Schwarz-Barac, Riedstadt (DE); Roger Recktenwald, Bensheim (DE); Werner Hoess, Messel (DE); Florian Band, Berlin (DE)

(72) Inventors: Thomas Hasskerl, Kronberg (DE); Klaus Koralewski, Riedstadt (DE); Sabine Schwarz-Barac, Riedstadt (DE); Roger Recktenwald, Bensheim (DE); Werner Hoess, Messel (DE); Florian Band, Berlin (DE)

(73) Assignee: EVONIK RÖHM GmbH, Darmstadt (DE)

( * ) Notice: Subject to any disclaimer, the term of this patent is extended or adjusted under 35 U.S.C. 154(b) by 17 days.

(21) Appl. No.: 14/377,061

(22) PCT Filed: Feb. 14, 2013

(86) PCT No.: PCT/EP2013/053006
§ 371 (c)(1),
(2) Date: Aug. 6, 2014

(87) PCT Pub. No.: WO2013/124210
PCT Pub. Date: Aug. 29, 2013

(65) Prior Publication Data
US 2014/0349093 A1    Nov. 27, 2014

(30) Foreign Application Priority Data
Feb. 24, 2012 (EP) .................................. 12156840

(51) Int. Cl.
| | |
|---|---|
| B32B 7/12 | (2006.01) |
| C09J 4/06 | (2006.01) |
| C09J 133/08 | (2006.01) |
| C09J 133/10 | (2006.01) |
| B32B 17/10 | (2006.01) |
| B32B 37/00 | (2006.01) |
| C08F 220/18 | (2006.01) |
| C08F 220/32 | (2006.01) |

(52) U.S. Cl.
CPC ............ B32B 7/12 (2013.01); B32B 17/10018 (2013.01); B32B 17/10036 (2013.01); B32B 17/10743 (2013.01); B32B 17/10899 (2013.01); B32B 37/00 (2013.01); C09J 4/06 (2013.01); C09J 133/08 (2013.01); C09J 133/10 (2013.01); B32B 2250/05 (2013.01); B32B 2250/40 (2013.01); B32B 2315/08 (2013.01); C08F 2220/1825 (2013.01); C08F 2220/325 (2013.01); Y02E 10/52 (2013.01); Y10T 428/2495 (2015.01); Y10T 428/266 (2015.01); Y10T 428/31645 (2015.04)

(58) Field of Classification Search
CPC .................. C08F 2220/325; C08F 2220/1825; C09J 133/10; C09J 133/08; C09J 4/06; B32B 17/10018; B32B 17/10899; B32B 17/10036; B32B 7/12; B32B 2250/05; B32B 2250/40; B32B 17/10743; B32B 2315/08; B32B 37/00; Y02E 10/52; Y10T 428/31645; Y10T 428/266; Y10T 428/2495
USPC .......... 428/213, 337, 441; 524/265, 523, 517; 522/38; 156/109
See application file for complete search history.

(56) References Cited

U.S. PATENT DOCUMENTS

| | | | |
|---|---|---|---|
| 3,867,222 A | 2/1975 | Plant et al. | |
| 5,506,051 A | 4/1996 | Levy-Borochov et al. | |
| 6,727,327 B1 * | 4/2004 | Gerst ................... | C08F 220/18 524/458 |
| 8,828,539 B2 * | 9/2014 | Hirose ................... | C09J 7/0217 428/355 AC |
| 2001/0023016 A1 | 9/2001 | Benz et al. | |
| 2004/0022970 A1 | 2/2004 | Trompert | |
| 2005/0039850 A1 * | 2/2005 | Benz ................. | B29C 66/73115 156/309.9 |
| 2005/0202198 A1 | 9/2005 | Hogan et al. | |
| 2006/0201078 A1 | 9/2006 | Card et al. | |
| 2010/0108127 A1 | 5/2010 | Hayes | |
| 2010/0108143 A1 | 5/2010 | Hayes | |
| 2011/0070434 A1 * | 3/2011 | Hirose ................... | C09J 7/0217 428/355 AC |

FOREIGN PATENT DOCUMENTS

| | | |
|---|---|---|
| AU | 2005200410 | 2/2005 |
| DE | 660634 | 3/1938 |
| DE | 2524729 | 12/1976 |
| DE | 2929491 | 2/1980 |
| DE | 19526912 | 1/1997 |

(Continued)

OTHER PUBLICATIONS

International Search Report issued Jun. 11, 2013, in PCT/EP13/053006 filed Feb. 14, 2013.

Primary Examiner — Michael Zhang
(74) Attorney, Agent, or Firm — Oblon, McClelland, Maier & Neustadt, L.L.P (57) ABSTRACT

Provided is an adhesive composition suitable for producing a laminate. The composition contains specified amounts of (a) polyisobutyl methacrylate, isobutyl methacrylate or a mixture thereof, (b) butyl acrylate, (c) polybutyl acrylate, (d) a (meth)acrylate compound and (e) a silicon compound. These components may be in polymerizable form, in polymerized form or in a combination of polymerizable form and polymerized form. The amounts of components (a) to (e) total 100 wt. % and the amount of (b) and (c) represents 30 to 90 wt. %, based on the sum total of components (a) to (e). The composition may optionally further contain from 0.1 to 6 wt. %, based on the total weight of the adhesive composition, of additives different from components (a) to (e) described above.

22 Claims, 1 Drawing Sheet

(56) References Cited

FOREIGN PATENT DOCUMENTS

| | | |
|---|---|---|
| DE | 10045006 | 1/2002 |
| DE | 10118617 | 11/2002 |
| DE | 102009025972 | 12/2010 |
| DE | 202010008723 | 2/2011 |
| EP | 259529 | 3/1988 |
| EP | 617078 | 9/1994 |
| EP | 1 134 075 A1 | 9/2001 |
| EP | 2199075 | 6/2010 |
| FR | 2856951 | 1/2003 |
| FR | 2925483 | 6/2009 |
| FR | 2948357 | 1/2011 |
| JP | 2012201733 A * | 10/2012 |
| WO | WO9962707 | 12/1999 |
| WO | WO0151279 | 7/2001 |
| WO | WO03078485 | 9/2003 |
| WO | WO2004011755 | 2/2004 |
| WO | WO2004089617 | 10/2004 |
| WO | WO2004089618 | 10/2004 |
| WO | WO2004089619 | 10/2004 |
| WO | WO2005005123 | 1/2005 |
| WO | WO2005058596 | 6/2005 |
| WO | WO2007080186 | 7/2007 |
| WO | WO2010010156 | 1/2010 |
| WO | WO2010063729 | 6/2010 |
| WO | WO2011080464 | 7/2011 |

* cited by examiner

Temperature profile of the climatic cycling test

ADHESIVE FOR PRODUCING COMPOSITE BODIES, A PLASTIC GLASS COMPOSITE OR COMPOSITE GLASS FOR ARCHITECTURE AND CONSTRUCTION

BACKGROUND OF THE INVENTION

1. Field of the Invention

The invention encompasses a new adhesive composition and also sheets produced from it, for producing laminates, more particularly for bonding plastic with glass components, a method for producing such laminates, and the laminates produced accordingly.

2. Description of the Background Art

Transparent laminated sheets of glass and plastic are already long-established. There are numerous applications for transparent laminated systems of glass and plastic.

Glass-polymer laminate systems are used, for example, for safety glazing systems in cars, where three-dimensionally curved laminated windows are employed. Examples are given in FR2856951A1 of windows with injection surrounds, and in EP617078B1 of adhesion-regulating and adhesion-reducing systems for more effective splinter binding. An aim with this application is for effective safety at minimum weight. In WO2007080186A1 the laminate claimed is between two preformed, especially thermally pretreated windows with a thermoplastic interlayer, with a description being given of PVB, for example. The window system is claimed specifically for car windows. The thermoplastic interlayer (adhesive layer) is not described in more detail, and no impact strength treatment is mentioned.

WO2001051279A2 describes, by pressing under pressure and temperature, a laminate of glass/adhesive resin/thermoplastic interlayer/adhesive resin/glass particularly for car windscreens.

FR2925483A1 describes a glass-polymer laminate with an internal crosslinked adhesive acrylic resin layer and with a polymer layer of PVB. DE10118617A1 similarly describes the lamination of two glass layers with an acrylic casting resin which, following application to the glass surface, is polymerized and also exhibits adhesion to electrochromic layers. DE2929491A1 (priority 20 Jul. 1979) claims a translucent safety glass comprising two outer glass plates with a central acrylic plate, and uses a flowable, reactive acrylate which is elastic after curing. The soft and tough interlayer is able to absorb some of the impact forces and distribute them over a relatively large area. The additional use of plasticizer acrylates is described. The central acrylate plate, with high impact strength, consists of polymethyl methacrylate (PMMA) and has an acrylic elastomer content of around 20%. Statements concerning a change in transmission as a consequence of temperature change are absent.

Moreover, WO2005058596A1 describes a glass-polymer laminate not only for car windows but also for laminates for architectural applications, consisting of the direct lamination of glass with a polymeric interlayer. This interlayer is based on ethylene-(meth)acrylic acid copolymers.

WO2005005123A1 describes a glass-film laminate in which the adhesion is increased by means of a film which is specially structured, by embossing, and which has increased roughness. Also claimed, in AU2005200410A1, is the structuring of a thermoplastic interlayer for glass laminates, based on plasticized polyvinyl acetal, for preventing the development of a moiré phenomenon. WO2011080464A1 and FR2948357A1 each describe a laminate of a mineral glass with an organic glass via an interlayer, which in order to prevent optical disruptions has a certain thickness variance. PMMA is among the organic glass described. For the thermoplastic interlayer (adhesive layer), descriptions are given of PVB, PU, etc.

US20050202198A1 claims the procedure for producing a laminate of glass, thermoplastic adhesive sheet, thermoplastic polymer plate, a further thermoplastic adhesive sheet, and a second glass pane. The adhesive sheet is based on thermoplastic polyurethane, which is provided with PE protective films. The central thermoplastic plate material used is polycarbonate (PC).

Laminated windows additionally play an important part in protection against shooting and explosions. Shot resistance is achieved by laminating a plurality of layers of thick glass panes, with soft or ductile polymer layers between them. Depending on the degree of shot resistance desired, the systems needed vary in thickness. Bulletproof windows are employed in cars, in armoured vehicles for military use, or in the protection of sensitive buildings. Examples are given in U.S. Pat. No. 5,506,051A of laminated windows with flexible interlayers, and in WO9962707A1 of a laminated glass with an external thick-layer coating.

As well as these applications, the use of laminated glazing is also specified for fire protection glazings, as for example via an intumescent layer in DE202010008723U1, for thin-layer photovoltaic modules in DE102009025972A1, for safety laminates and solar modules with a polyolefin-based outer layer for improving the abrasion resistance in US20100108143A1 and US20100108127A1, and for special glazing systems with further finishes and properties, such as anti-breaking glazing systems in DE 19526912 A1, for example, through use of layered sheets, and in EP2199075A1, through ethylene-methacrylic acid copolymers, for surface lamination.

Also known are special windows such as, for example, lead glazing systems in EP259529B1, glass-plastic laminates with electrically conductive layers and a gas-filled zone in WO2010063729A1 and US20040022970A1, TV front screens in U.S. Pat. No. 3,867,222A, and also heat management, and stormproof or hurricane-resistant glazing systems for buildings, with special silicate glasses having extreme load-bearing properties. WO2004089617A1, WO2004089618A1, WO2004089619A1 and WO2004011755A1 claim direct adhesion to glass using ethylene-methacrylic acid copolymers. Likewise noteworthy here is US20060201078A1, which claims a glass laminate of glass and a thermoplastic, high-impact polymer layer, which by virtue of a special construction allows the realization of extensive glass laminate areas without further frame reinforcement.

DE10045006C1 describes a casting resin which comprises reactive acrylate- or methacrylate-functional oligomers. Statements concerning behaviour after temperature cycling stress are absent.

WO2010010156A1 claims a safety glazing system based on glass windows and thermoplastic interlayers with improved acoustics. All that is said about the thermoplastics is that within the overall laminated system their acoustics are better than with PVB. There is no further description of the thermoplastics.

DE660634C specifies a method for producing a splinterproof laminated glass with high weathering stability, by joining the glass windows using a soft polyacrylate interlayer. The polyacrylate interlayer can be produced by laminating a film produced from the monomers, or by polymerizing the monomers between the glass plates. DE2524729A1 describes a safety glass composed of mineral glass and polycarbonate with soft interlayers. WO03078485A1 describes a laminated glass made up of comparatively thin outer glass windows and PMMA interlayer with adhesion-promoting components based on silane.

In the adhesive bonding of glass and PMMA, stresses occur because of the differences in thermal expansion coefficient between glass and PMMA, and these stresses, in the event of sharp temperature differences, can lead to warping, delamination or destructive rupture of the laminated windows. If, for example, thin glass is joined using soft adhesives, there is the problem that the striking of a hard object against the hard silicate glass may easily entail damage. If a hard composite material is used as in WO03078485A1, the laminate plate does remain undamaged on striking, in spite of thin glass, but the laminated system is unable to accommodate the stresses between the glass sides during climatic change or in the event of large temperature differences.

As demonstrated by the multiplicity of patent applications, a large demand exists for composite glass systems having an expanded spectrum of properties, with weight in particular playing a prominent part. There have already been numerous attempts to produce lightweight and long-lived glass-polymer laminates with further properties, and yet to date no success has been achieved in producing long-lived glass-polymer laminates with low weight, with heat and noise insulation properties and with very good optical properties, in a cost-effective procedure. Consequently there continues to be a need for new materials, especially adhesives for producing laminates, more particularly those of glass and plastic.

SUMMARY OF THE INVENTION

An object of the present invention, therefore, was to provide an adhesive composition (adhesive) and sheets produced therefrom (adhesive sheets), for the production of laminates, preferably for the bonding of plastics elements and glass elements, which do not have the disadvantages of the prior art, or have them only to a reduced extent.

One specific object can be seen as that of providing an adhesive or adhesive sheet that is sufficiently elastic to compensate the differences which occur on thermal expansion of the elements to be bonded to one another.

A further specific object was that of providing an adhesive or adhesive sheet that allows the clear transparency to be maintained over a sufficiently wide temperature range. The layer used as adhesive between glass and PMMA shall preferably remain transparent—that is, have a haze <3.5%—within temperature ranges from −40° C. to 80° C.

Likewise a specific object of the present invention was the provision of a glazing material for buildings and vehicles that meets as many as possible of the following requirements: low weight, glasslike surface properties, such as chemical resistance, impact resistance and scratch resistance, optionally, excellent sound and heat insulation, high transparency, yellowing resistance, resistance to UV light and climatic fluctuation stress, splinter binding and overhead protection, good glass-polymer adhesion, and long life for many years.

Other objects, not explicitly stated, will become apparent from the overall context of the present description, examples, claims and FIGURES.

The inventors have now surprisingly found that an adhesive composition according to Claim 1 is able to achieve the stated objects.

DETAILED DESCRIPTION OF THE INVENTION

The present specification accordingly provides adhesive compositions according to Claim 1. The composition in question may be an already polymerized composition that can be used, for example, as a hot-melt adhesive. Alternatively it may be a polymerizable composition, which may comprise only monomers or else a mixture of monomers and polymers. From a polymerizable composition of the invention it is possible directly to produce an adhesive layer between two elements that are to be joined. From an adhesive composition of the invention, preferably in the form of a polymerizable composition, it is alternatively possible first to produce a sheet, which is then placed between two elements that are to be bonded, these elements then being joined by lamination. The said sheet and also the methods described for producing the laminates are likewise provided by the present invention. Provided lastly by the present invention are laminates comprising an adhesive of the invention, and/or adhesive sheets of the invention.

The adhesive composition of the invention and/or the adhesive sheet may preferably be produced without styrene. In comparison to PMMA or butyl methacrylate-based adhesives with styrene, the resultant adhesive layer features a greater elasticity.

As a result of the high compatibility of the monomers and polymers used in accordance with the invention, the clear transparency can be maintained over a wide temperature range.

The laminates produced with the adhesive composition of the invention exhibit very good mechanical properties when exposed to impact and shear.

In the −40° C. to 80° C. climatic cycling test, there is no delamination and the optical properties are not impaired.

In accordance with the invention, the expression "(meth)acrylate" encompasses methacrylates and acrylates and also mixtures of both.

The adhesive composition of the invention may take the form of copolymers or of blends of different polymers from the components a) to e) specified in Claim 1. In that case the system involved is not a reactive system, but is instead a system in which the adhesive must first be melted before it is able to join two components to one another. The customary term for this is a "hot-melt adhesive".

The adhesive composition of the invention may also, however, take the form of a reactive system, i.e. of a polymerizable composition. A "polymerizable composition" in the sense of the present invention denotes a composition which comprises one or more monomers, which can be converted into high molecular mass compounds, called polymers, by means of polymerization processes that are known in the prior art, such as radical, anionic and cationic polymerization, for example. These polymers, in the sense of the present invention, have a numerical average degree of polymerization $P_n$ of at least 10. For further details, reference is made to the disclosure by H. G. Elias, Makromoleküle, Volumes 1 and 2, Basel, Heidelberg, NewYork, Hüthig and Wepf., 1990, and to Ullmann's Encyclopedia of Industrial Chemistry, 5th edn., "Polymerization Processes". This reactive system can in one case be brought directly between two elements that are to be bonded, and can be polymerized, to form the adhesive layer. An alternative option is first to produce an adhesive sheet from the reactive system and then to dispose this sheet between two elements that are to be bonded, and thereafter to bond them by lamination.

The terms "sheet produced from the polymerizable composition of the invention" and "adhesive sheet" are used synonymously.

The adhesive composition of the invention comprises:
 a) 10 to 60 wt. % of polyisobutyl methacrylate or isobutyl methacrylate or a mixture thereof b) 0 to 80 wt. % of butyl acrylate
c) 0 to 60 wt. % of polybutyl acrylate
d) 0 to 5 wt. % of at least one (meth)acrylate of the formula (I)

(I)

where X=O or N, $R^3$ is a hydrogen atom or a methyl group and $R^4$ is a hydrogen atom or denotes an aliphatic or cycloaliphatic radical having 1 to 20 carbon atoms that has at least one hydroxyl group, thiol group, primary amino group, secondary amino group, and/or an epoxy group,
e) 0 to 5 wt. % of at least one silicon compound obtainable by reacting 0 to 5 parts by weight of at least one silicon compound of the formula (II):

$$Si_mR^1{}_nR^2{}_oO_rX_s \qquad (II)$$

where $R^1$ independently at each occurrence denotes an alkenyl or cycloalkenyl radical having 2 to 12 carbon atoms that may have one or more ester groups,
$R^2$ independently at each occurrence denotes an alkyl or cycloalkyl radical having 1 to 12 carbon atoms,
X independently at each occurrence represents a halogen atom or an alkoxy group having 1 to 6 carbon atoms,
m is an integer greater than or equal to 1,
n is an integer between 1 and 2*m+1,
o is an integer between 0 and 2*m,
r is an integer between 0 and m−1,
s is an integer between 1 and 2*m+1, and
where m, n, o and s satisfy the relation (1):

$$n+o+s=2*m+2 \qquad (1)$$

with 0.01 to 2 parts by weight of water and 0 to 4 parts by weight of at least one acid.

The sum total of components a) to e) is 100 wt. %, and the amount of b) and c) is in total at least 30 wt. %, preferably 30 to 90 wt. %, based on the sum total of components a) to e). In other words, the invention encompasses only those combinations of the above weight figures that result for components a) to e)—viewed per se—together in 100 wt. %.

Besides components a) to e), the adhesive composition of the invention may further comprise a total of 0.1 to 6 wt. %, preferably 0.1 to 5 wt. % and more preferably 0.2 to 4 wt. %, based in each case on the total weight of the adhesive composition, of further additives, different from components a) to e), that can typically be used for producing methacrylate-based adhesives, such as polymerization initiators, for example. While the sum total of components a) to e) is inherently 100 wt. %, it is nevertheless the case that, based on the adhesive composition as a whole, this 100 wt. % corresponds to 100 wt. % of the adhesive composition only when there is no further additive present. Where further additives are present, the fraction of the sum total of components a) to e) is given by the total mass of the adhesive composition (corresponding to 100 total wt. %) minus the fraction of the additives in wt. %, based on the total mass of the adhesive composition.

As component a), the adhesive composition of the invention comprises 10 to 60 wt. %, preferably 20 to 50 wt. %, more preferably 20 to 40 wt. %, based in each case on the sum total of components a) to e), of polyisobutyl methacrylate or isobutyl methacrylate or a mixture thereof. Where a mixture of polyisobutyl methacrylate and isobutyl methacrylate is present, the mixing ratio of polyisobutyl methacrylate to isobutyl methacrylate is preferably 95 to 50 parts by weight: 5 to 50 parts by weight, and especially 90 to 70 parts by weight: 10 to 30 parts by weight. A mixing ratio of this kind brings the following advantages: the viscosity can be lowered, especially if relatively high molecular mass polyisobutyl methacrylate is used, thereby facilitating the filling of polymerization chambers. Through the use of the isobutyl methacrylate as a diluting component, the heat distortion resistance and the shear strength are retained, relative to dilution with butyl acrylate.

In one particularly preferred embodiment, component a) consists to an extent of at least 80 wt. %, preferably 90 wt. %, of polyisobutyl methacrylate.

The inventors have found that for the bond strength of the adhesive compositions of the invention it is of advantage if they comprise at least 10 wt. % of polymers. These are more preferably polymers of component a) and/or of component c) and/or a copolymer of components a) and d). Adhesive compositions of the invention that prove to be especially advantageous are those in the form of a polymerizable composition having 10 to 70 wt. %, preferably 10 to 60 wt. %, more preferably 20 to 50 wt. % and very preferably 20 to 40 wt. %, based in each case on the sum total of components a) to d), of polymeric constituents. Correspondingly, these particularly preferred adhesive compositions have 90 to 30 wt. %, preferably 90 to 40 wt. %, more preferably 80 to 50 wt. % and very preferably 80 to 60 wt. %, based in each case on the sum total of components a) to d), of monomeric constituents.

With an increasing fraction of component a) in the adhesive layer it has been found that the shear strength increases. In other words, the harder the laminate layer, the better the mechanical strength. Too high a fraction of component a), however, may result in instances of deformation of the laminates.

The adhesive composition of the invention therefore comprises 0 to 80 wt. % of butyl acrylate and/or 0 to 50 wt. % of polybutyl acrylate as component b) and c), respectively, with the amount of b) and c) totaling 30 to 90 wt. %, more preferably 40 to 80 wt. %, very preferably 50 to 80 wt. %. The figures in wt. % are based in each case on the sum total of components a) to e) in the adhesive composition of the invention.

In one preferred embodiment, of the components b) and c), exclusively b) is present. In another particularly preferred embodiment of the present invention, some of the butyl acrylate is replaced by polybutyl acrylate. The fraction of polybutyl acrylate, based in each case on the sum total of components a) to e), in the adhesive composition of the invention is preferably 0 to 40 wt. %, more preferably 0 to 35 wt. %, very preferably 1 to 30 wt. % and especially preferably 5 to 20 wt. %. The amount of butyl acrylate is supplemented, accordingly, to give the aforementioned sum total figures for b)+c).

The inventors have found that butyl acrylate and polybutyl acrylate are highly compatible with one another and in particular are also highly compatible with isobutyl methacrylate and/or polyisobutyl methacrylate. This ensures that after the polymerization, a glass-clear laminate layer (haze <3.5%) is obtained. The inventors are further of the view that the selection of components a) to c) is also responsible for these systems retaining very good optical properties even after a demanding climatic cycling test.

Also present preferably in the adhesive composition is component d). This component comprises at least one (meth)acrylate of the formula (I)

X=O or N, $R^3$ is a hydrogen atom or a methyl group. $R^4$ denotes hydrogen or an aliphatic or cycloaliphatic or heterocyclic radical having 1 to 20 carbon atoms, preferably 1 to 12 carbon atoms, more particularly 2 to 6 carbon atoms, that has at least one hydroxyl group, thiol group, primary amino group, secondary amino group, and/or an epoxy group.

The (meth)acrylates d) that can be used in accordance with the invention include among others
hydroxyalkyl(meth)acrylates, such as 3-hydroxypropyl(meth)acrylate,
3,4-dihydroxybutyl(meth)acrylate, 2-hydroxyethyl(meth)acrylate,
2-hydroxypropyl(meth)acrylate, 2,5-dimethyl 1,6-hexanediol(meth)acrylate,
1,10-decanediol(meth)acrylate and 1,2-propanediol(meth)acrylate;
polyoxyethylene and polyoxypropylene derivatives of (meth)acrylic acid, such as triethylene glycol(meth)acrylate, tetraethylene glycol(meth)acrylate and tetrapropylene glycol(meth)acrylate;
aminoalkyl(meth)acrylates, such as 2-[N,N-dimethylamino]ethyl(meth)acrylate, 3-[N,N-dimethylamino]propyl(meth)acrylate, 2-[N,N-diethylamino]ethyl(meth)acrylate, 3-[N,N-diethylamino]propyl(meth)acrylate and 2-(4-morpholinyl)ethyl(meth)acrylate;
oxiranyl(meth)acrylates, such as 2,3-epoxybutyl(meth)acrylate, 3,4-epoxybutyl(meth)acrylate and glycidyl(meth)acrylate;
mercaptoalkyl(meth)acrylates, such as 2-mercaptoethyl(meth)acrylate and 3-mercaptopropyl(meth)acrylate,
acrylic acid, methacrylic acid, glycidyl acrylate, acrylamide, methacrylamide, N-methylmethacrylamide, N,N-dimethylacrylamide, N,N-diethylacrylamide, N,N-dimethylmethacrylamide, N,N-diethylmethacrylamide, N-isopropylacrylamide, N-isopropylmethacrylamide, N,N-dimethylaminopropylacrylamide,
N-hydroxyethylacrylamide, N-methylolmethacrylamide, acryloylmorpholine, N-vinylpyrrolidone, N-methacryloylurea, N-acetylmethacrylamide, N-ethoxycarbonylaminomethylmethacrylamide, 2-(4-morpholinyl)ethyl methacrylate, N-methylolacrylamide, N-methoxymethylacrylamide, N-methacryloyl-2-pyrrolidone, N-(methacrylamidomethyl)pyrrolidone, N-(methacrylamido-methyl)caprolactam, N-isobutoxymethylmethacrylamide, 2-(1-imidazolyl)ethyl methacrylate, N-3-dimethylaminopropylmethacrylamide, 3-dimethylamino-2,2-dimethylpropyl methacrylate, 2-N-morpholinoethyl acrylate, N-(3-morpholinopropyl)methacrylamide.

(Meth)acrylates d) that are preferred for the purposes of the present invention encompass (meth)acrylic acid, hydroxyalkyl(meth)acrylates, aminoalkyl(meth)acrylates, oxiranyl (meth)acrylates and mercaptoalkyl(meth)acrylates, more particularly glycidyl(meth)acrylate. They are used preferably with a weight fraction >50 wt. %, usefully >75 wt. %, more particularly >95 wt. %, based on all (meth)acrylates d).

In accordance with the invention the total amount of (meth)acrylates d) must not exceed 5 wt. %, since otherwise unfavourable effects may occur in the polymer obtainable by polymerizing the composition, such as an increased water swellability in the case of the use of (meth)acrylic acid or hydroxyalkyl(meth)acrylates, for example, or a marked yellowing in the case of the use of substituted (meth)acrylates containing amino groups. The amount of component d) is therefore preferably present in a fraction, in the adhesive composition of the invention, of 0 to 3 wt. %, more preferably of 0 to 2.5 wt. %, very preferably 0 to 2 wt. % and especially preferably 0.5 to 1.5 wt. %, based in each case on the sum total of components a) to e).

Component d) is added typically as a separate component. In one preferred embodiment, however, it is also possible first to prepare a copolymer from components a) and d) and/or b) and d), and to use this copolymer to produce the adhesive composition.

Likewise included preferably in the adhesive composition of the invention is component e). This component is a silicon compound which is obtained by reacting 0 to 5 parts by weight of a silicon compound of the formula (II):

$$Si_m R^1_n R^2_o O_r X_s \quad (II)$$

where $R^1$ independently at each occurrence denotes an alkenyl or cycloalkenyl radical having 2 to 12 carbon atoms that may have one or more ester groups,
$R^2$ independently at each occurrence denotes an alkyl or cycloalkyl radical having 1 to 12 carbon atoms,
X independently at each occurrence represents a halogen atom or an alkoxy group having 1 to 6 carbon atoms,
m is an integer greater than or equal to 1,
n is an integer between 1 and 2*m+1,
o is an integer between 0 and 2*m,
r is an integer between 0 and m−1,
s is an integer between 1 and 2*m+1, and
where m, n, o and s satisfy the relation (1):

$$n+o+s=2*m+2 \quad (2)$$

with 0.01 to 2 parts by weight of water and 0 to 5, preferably 0.01 to 4.0 parts by weight, preferably 0.01 to 2.0 parts by weight, of at least one acid.

In formula (II) the radicals $R^1$ independently at each occurrence denote an alkenyl or cycloalkenyl radical having 2 to 12 carbon atoms, that may have one or more ester groups. These radicals include among others vinyl, prop-1-enyl, prop-2-enyl, but-3-enyl, pent-4-enyl, hex-5-enyl, hept-6-enyl, oct-7-enyl, non-8-enyl, dec-9-enyl, undec-10-enyl, dodec-1'-enyl, 2-vinylcyclopentyl, 2-vinylcyclohexyl, γ-methacryloyloxyethyl, γ-acryloyloxyethyl, γ-methacryloyloxypropyl and γ-acryloyloxypropyl, and also the known structural isomers of these radicals. Preferred radicals in the sense of the present invention encompass vinyl, γ-methacryloyloxyethyl, γ-acryloyloxyethyl, γ-methacryloyloxypropyl and γ-acryloyloxypropyl, usefully γ-methacryloyloxyethyl, γ-acryloyloxyethyl, γ-methacryloyloxypropyl and γ-acryloyloxypropyl, more particularly γ-methacryloyloxypropyl and γ-acryloyloxypropyl. The γ-methacryloyloxypropyl radical is especially preferred.

The radicals $R^2$ represent independently at each occurrence an alkyl or cycloalkyl radical having 1 to 12 carbon atoms, preferably 1 to 6 carbon atoms, more particularly 1 to 4 carbon atoms. These radicals include among others methyl, ethyl, n-propyl, isopropyl, n-butyl, isobutyl, tert-butyl, n-pentyl, n-hexyl, n-heptyl, n-octyl, n-nonyl, n-decyl, n-undecyl, n-dodecyl, cyclopentyl and cyclohexyl, and also the known structural isomers of these radicals.

The radicals X denote independently at each occurrence a halogen atom, such as fluorine, chlorine, bromine or iodine, or an alkoxy group having 1 to 6 carbon atoms, such as, for example, a methoxy, ethoxy, n-propoxy, isopropoxy, n-butoxy, sec-butoxy, tert-butoxy, n-pentoxy or n-hexoxy group. According to one preferred embodiment of the present invention, X denotes independently at each occurrence a chlorine atom or a bromine atom. According to a further preferred embodiment of the present invention, X independently at each occurrence represents an alkoxy group having 1 to 6 carbon atoms, preferably 1 to 4 carbon atoms, more particularly 1 to 2 carbon atoms.

The index m denotes an integer greater than or equal to 1, usefully in the range from 1 to 10, preferably in the range from 1 to 6, more particularly in the range from 1 to 4, i.e. 1, 2, 3 or 4. Especially advantageous results are obtained for m=1.

The index n is an integer between 1 and 2*m+1, usefully 1 or 2, more particularly 1.

The index o is an integer between 0 and 2*m, usefully between 0 and 20, preferably between 0 and 2, more particularly 0.

The index r is an integer between 0 and m−1, usefully between 0 and 9, preferably between 0 and 3, more particularly 0.

The index s is an integer between 1 and 2*m+1, usefully between 1 and 21, preferably between 1 and 13, more particularly between 1 and 9. Especially advantageous results are obtained for s=3.

It is necessary here for the indices m, n, o and s to satisfy the relation (1):

$$n+o+s=2*m+2 \tag{1}$$

In the context of one preferred embodiment of the present invention, the composition of the invention is obtainable by using at least one silicon compound of the formula (IIa)

$$SiR^1{}_nX_s \tag{IIa}$$

as silicon compound e). Here n is an integer between 1 and 3 and s=4−n. Silicon compounds of the formula (IIa) therefore encompass $SiR^1X_3$, $SiR^1{}_2X_2$ and $SiR^1{}_3X$.

In the context of a further preferred embodiment of the present invention, the composition of the invention is obtainable by using a mixture comprising at least one silicon compound of the formula (IIb)

$$SiR^1{}_nX_s \tag{IIb}$$

and at least one silicon compound of the formula (IIc)

$$SiR^2{}_oX_s \tag{IIc}$$

as silicon compound e). Here in formula (IIb) n is an integer between 1 and 3 and s=4−n. In formula (IIc) o is an integer between 1 and 3 and s=4−o. Compounds of the formula (IIc) therefore encompass $SiR^2X_3$, $SiR^2{}_2X_2$ and $SiR^2{}_3X$, more particularly alkyltrialkoxysilanes, dialkyldialkoxysilanes, trialkylalkoxysilanes, alkylsilyl trihalides, dialkylsilyl dihalides and trialkylsilyl halides. The compounds of the formula (IIc) that are particularly preferred in accordance with the invention include trichloromethylsilane, dichlorodimethylsilane, chlorotrimethylsilane, tribromomethylsilane, dibromodimethylsilane, bromotrimethylsilane, trichloroethylsilane, dichlorodiethylsilane, chlorotriethylsilane, tribromoethylsilane, dibromodiethylsilane, bromotriethylsilane, trimethoxymethylsilane, dimethoxydimethylsilane, methoxytrimethylsilane, triethoxymethylsilane, diethoxydimethylsilane, ethoxytrimethylsilane, trimethoxyethylsilane, dimethoxydiethylsilane, methoxytriethylsilane, triethoxymethylsilane, diethoxydimethylsilane and ethoxytrimethylsilane.

Results particularly favourable in accordance with the invention are obtained using one or more silicon compounds of the formula (IId)

as silicon compound e). Having proved itself in particular in this context is the use, especially, of vinyltrimethoxysilane, γ-methacryloyloxyethyltrimethoxysilane, γ-acryloyloxyethyl-trimethoxysilane, γ-methacryloyloxypropyltrimethoxysilane, γ-acryloyloxypropyltrimethoxysilane, vinyltriethoxysilane, γ-methacryloyloxyethyltriethoxysilane, γ-acryloyloxyethyltriethoxysilane, γ-methacryloyloxypropyltriethoxysilane, γ-acryloyloxypropyltriethoxysilane, vinyltrichlorosilane, γ-methacryloyloxyethyltrichlorosilane, γ-acryloyloxyethyltrichlorosilane, γ-methacryloyloxypropyltrichlorosilane, γ-acryloyloxypropyltrichlorosilane, vinyltribromosilane, γ-methacryloyloxyethyltribromosilane, γ-acryloyloxyethyltribromosilane, γ-methacryloyloxypropyltribromosilane and/or γ-acryloyloxypropyltribromosilane.

Especially suitable silicon compounds of the formula (IId) include the compounds γ-methacryloyloxypropyltriethoxysilane, γ-acryloyloxypropyltriethoxysilane, γ-methacryloyloxypropyltrimethoxysilane, γ-acryloyloxypropyltrimethoxysilane and/or vinyltriethoxysilane, more particularly γ-methacryloyloxypropyltriethoxysilane.

The silicon compound e) may be used individually or else as a mixture of two or more silicon compounds.

Acids in the sense of the invention encompass all known organic and inorganic Brønsted acids, preferably organic Brønsted acids. Also possible, furthermore, is the use of polyacids, particularly of isopolyacids and heteropolyacids, and also of mixtures of different acids. Acids that can be used in accordance with the invention include, among others, HF, HCl, HBr, HI, $H_2SO_4$, $H_2SO_3$, $H_3PO_4$, formic acid, acetic acid, propionic acid, butyric acid, pentanoic acid, hexanoic acid, citric acid, methacrylic acid and acrylic acid. Particularly preferred in accordance with the invention here is the use of ethylenically unsaturated organic acids, more particularly of methacrylic acid and acrylic acid, since in the course of the polymerization of the composition, these acids are likewise copolymerized. The acids of the invention are preferably soluble in water, usefully having a water-solubility >10 g/l at 20° C. The amount of acid is preferably selected in accordance with the invention such that the pH of the solution of silicon compound, water and/or acid is preferably in the 1 to <7 range, more particularly in the 4 to 6 range, at 20° C.

Although it is not possible at present to give a precise specification of the reaction product, it is presently assumed that the silicon compounds of the formula (II) are at least partly hydrolysed by the water. This hydrolysis presumably leads to more highly condensed products, which may have branching and bridging groups of the formula (IIe)

(IIe)

The amount of water is preferably 0.1 to 3.0 parts by weight, usefully 2.0 to 3.0 parts by weight, more particularly 2.8 to 3.0 parts by weight.

The reaction can be carried out in a conventional way, preferably with stirring. The reaction temperature here may be varied over a wide range, but frequently the temperature is situated within the range from 0.0° C. to 100.0° C., preferably in the range from 10.0° C. to 60.0° C., more particularly in the range from 20° C. to 30° C. Similar comments apply to the pressure at which the reaction is implemented. Accordingly, the reaction may take place at subatmospheric pressure and at superatmospheric pressure. Preferably, however, it is carried out at atmospheric pressure. The reaction may take place under air or else under an inert gas atmosphere, such as under a nitrogen or argon atmosphere, for example; preferably, a small oxygen fraction is present.

The end point of the reaction is frequently discernible from the disappearance of the second phase originally present (water) and the formation of a homogeneous phase. The hydrolysis time in this case is generally temperature-dependent. At a higher temperature, the hydrolysis proceeds more quickly than at a low temperature. At a temperature of 22° C., a homogenous phase is formed generally after just 30 minutes. A higher temperature, 30° C. for example, generally has the effect that a homogeneous phase is formed after just 15 minutes. Conversely, hydrolysis takes longer accordingly at lower temperatures. It is advantageous if the hydrolysed mixture, following the hydrolysis and the formation of a single phase, is left to stand or is stirred for a time in order to ensure that hydrolysis is complete. To save time, however, the hydrolysed mixture can also be mixed and polymerized with the remainder of the components after a uniform phase has been formed. In the case of very long standing times after the hydrolysis, of several hours through to several days, depending on reaction temperature, condensation of the silanols may begin under certain circumstances.

In the context of the present invention, the reaction is usefully continued until a homogeneous solution is obtained. Reaction times in the range from 1 minute to 48 hours, usefully in the range from 15 minutes to 48 hours, more particularly in the range from 30 minutes to 4 hours, have proved themselves especially in this context.

The adhesive compositions of the invention can be produced without addition of components d) and/or e). It has nevertheless been found that the addition of component d) and/or e) significantly improves the shear strength of the laminated windows. The fraction of component e) is therefore preferably 0 to 3 wt. %, more preferably from 0 to 2.5 wt. %, very preferably 0 to 2 wt. %, and with more particular preference 0.1 to 1.5 wt. %, based in each case on the sum total of components a) to e), in the adhesive composition of the invention.

In the context of the present invention, the combination in particular of an epoxy-functional (meth)acrylate and of a vinyl- or methacryloyl-functional trialkoxysilane, and specifically the combination of glycidyl methacrylate, acrylic acid, methacrylic acid, glycidyl acrylate, acrylamide, methacrylamide, N-methylmethacrylamide, N,N-dimethylacrylamide, N,N-diethylacrylamide, N,N-dimethylmethacrylamide, N,N-diethylmethacrylamide, N-isopropylacrylamide, N-isopropylmethacrylamide, N,N-dimethylaminopropylacrylamide, N-hydroxyethylacrylamide, N-methylolmethacrylamide, acryloylmorpholine, N-vinylpyrrolidone, hydroxyethyl acrylate, hydroxyethyl methacrylate, hydroxypropyl acrylate, hydroxypropyl methacrylate, especially preferably glycidyl methacrylate, acrylic acid, methacrylic acid, glycidyl acrylate (as (meth)acrylate component d)), with γ-methacryloyloxypropyltrimethoxysilane, methacryloyloxypropyltriethoxysilane, acryloyloxypropyltriethoxysilane, acryloyloxypropyltrimethoxysilane, acryloyltripropoxysilane, methacryloyltripropoxysilane, vinyltrimethoxysilane, vinyltriethoxysilane, acryloyloxy-2-hydroxypropoxypropyltrimethoxysilane (as silicon compound component e)), leads to a very particular improvement in the resistance of the laminated glazing obtainable from the compositions in question, relative to rapid temperature changes, and also in the adhesive strength and the shear strength under mechanical load.

Besides components a) to e), the adhesive composition of the invention may further comprise a total of 0.1 to 6 wt. %, preferably 0.1 to 5 wt. % and more preferably 0.2 to 4 wt. %, based in each case on the total weight of the adhesive composition, of further additives—different from components a) to e)—that can typically be used for the production of methacrylate-based adhesives. Any residual monomer content on the part of the polybutyl acrylate used is taken into account as well with regard to the quantity figures in the present invention in the case of component c)—in other words, component c) is based on the total weight of polybutyl acrylate+impurities in the polybutyl acrylate employed.

The additives used in accordance with the invention may be, for example, polymerization initiators, photoinitiators, impact modifiers, preferably in the form of block copolymers with soft and hard segments, UV stabilizers, UV absorbers, sterically hindered amines (HALS), wetting agents, dispersing additives, antioxidants, chain transfer agents and polymerization inhibitors.

Where the adhesive composition of the invention is in the form of a polymerizable composition, it preferably comprises at least one polymerization initiator. The polymerization reaction may in principle be initiated in any way familiar to the skilled person, as for example using a radical initiator (e.g. peroxide, azo compound), or may be initiated by exposure to UV radiation, visible light, α rays, β rays or γ rays, or a combination thereof.

In one preferred embodiment of the present invention the polymerization is initiated using one or more lipophilic radical polymerization initiators. The radical polymerization initiators are lipophilic especially so that they dissolve in the mixture of the bulk polymerization. Compounds which can be used include not only the conventional azo initiators, such as azoisobutyronitrile (AIBN), 1,1-azobiscyclohexanecarbonitrile and azobis(2,4-dimethylvaleronitrile) but also, among others, aliphatic peroxy compounds, such as, for example, tert-amyl peroxyneodecanoate, tert-butyl peroxyneodecanoate, tert-amyl peroxypivalate, tert-butyl peroxypivalate, tert-amyl peroxy-2-ethylhexanoate, tert-butyl peroxy-2-ethylhexanoate, tert-amyl peroxy-3,5,5-trimethylhexanoate, tert-butyl peroxy-3,5,5,-trimethylhexanoate, ethyl 3,3-di(tert-amyl peroxy)butyrate, tert-butyl perbenzoate, tert-butyl hydroperoxide, decanoyl peroxide, dilauroyl peroxide, benzoyl peroxide, bis(4-tert-butylcyclohexyl)peroxydicarbonate and any desired mixtures of the stated compounds. Preferred among the aforementioned compounds are tert-butyl peroxyneodecanoate, tert-butyl peroxypivalate, tert-butyl peroxy-2-ethylhexanoate, dilauroyl peroxide, dibenzoyl peroxide, bis(4-tert-butylcyclohexyl)peroxydicarbonate. Especially preferred is bis(4-tert-butylcyclohexyl)peroxydicarbonate.

In a further preferred embodiment of the present invention the polymerization is initiated using known photoinitiators, by exposure to UV radiation or the like. Here it is possible for the common, commercially available compounds to be employed, such as, for example, benzophenone, α,α-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl o-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, ethyl 2,4,6-trimethylbenzoylphenylphosphinate, bisacylphosphine oxide, and others, it being possible for the stated photoinitiators to be utilized alone or in combination of two or more or in combination with one of the above polymerization initiators.

In the context of the present invention the polymerization initiators are usefully selected in accordance with the desired thickness of the adhesive layer or adhesive sheet. The composition to be polymerized in the present invention more preferably comprises not only thermal initiators, especially azo initiators or peroxides, but also photoinitiators.

The amount of the initiators may vary within wide ranges. It is preferred, for example, to employ amounts in the range from 0.01 to 5.0 wt. %, based on the total weight of the adhesive composition. Particularly preferred is the use of amounts in the range from 0.1 to 2.0 wt. %, more particularly amounts in the range from 0.2 to 1.5 wt. %.

Important additives are UV stabilizers, which are available in the form of UV absorbers or as radical scavengers. Among the UV absorbers, long-lived products with little intrinsic colour are particularly preferred. Examples of suitable UV absorbers are benzotriazoles such as, for example, Tinuvin 1130 and triazines such as, for example, Tinuvin 400, and also copolymerizable UV absorbers with (meth)acrylate function such as RUVA-93 from Otsuka Chemicals.

Radical scavengers that can be used include sterically hindered amines (HALS). Examples of suitable HALS compounds are as follows: bis(1-octyloxy-2,2,6,6-tetramethyl-4-piperidyl) sebacate, bis(1,2,2,6,6-pentamethyl 4-piperidyl) sebacate, methyl 1,2,2,6,6-pentamethyl 4-piperidylsebacate, etc.

Chain transfer agents are preferably added particularly when producing the adhesive sheets, since the technical processing properties such as extrudability or processability as a hot-melt adhesive are regulated via the regulation of molecular weight. In the case of the casting resin system, there is generally no need for any chain transfer agents. Preferred amounts of chain transfer agents are in the range from 0.05 to 0.5 wt. %, based on the overall composition. Preferred chain transfer agents are 2-ethylhexyl thioglycolate, 2-mercaptoethanol, n-dodecyl mercaptan, tert-dodecyl mercaptan, octyl mercaptan, methyl 3-mercaptopropionate and pentaerythritol tritetrathioglycolate.

Particularly preferred adhesive compositions have compositions of components a) to e) as indicated below.

In the preferred variant 1, components a) to e) are comprised or not comprised in the amounts specified below:
a) 20 to 50 wt. %, preferably 20 to 40 wt. %, of polyisobutyl methacrylate or isobutyl methacrylate or a mixture thereof
b) 44 to 79 wt. % of butyl acrylate
c) 0 wt. % of polybutyl acrylate, i.e. there is no polybutyl acrylate present
d) 0.5 to 3 wt. %, preferably 1 to 2 wt. %, of (meth)acrylate or epoxy-functional (meth)acrylate, preferably glycidyl methacrylate
e) 0.5 to 3 wt. %, preferably 1 to 2 wt. %, of vinylic and/or (meth)acryloyl-substituted trialkoxysilanes, preferably gamma-methacryloyloxypropyltrimethoxysilane.

In the preferred variant 2, components a) to e) are comprised in the amounts specified below:
a) 20 to 50 wt. %, preferably 20 to 40 wt. % of polyisobutyl methacrylate or isobutyl methacrylate or a mixture thereof
b) 24 to 79 wt. % of butyl acrylate
c) 5 to 50 wt. %, preferably 5 to 30 wt. % of polybutyl acrylate
d) 0.5 to 3 wt. %, preferably 1 to 2 wt. %, of (meth)acrylate or epoxy-functional (meth)acrylate, preferably glycidyl methacrylate
e) 0.5 to 3 wt. %, 1 to 2 wt. %, of vinylic and/or (meth)acryloyl-substituted trialkoxysilanes, preferably gamma-methacryloyloxypropyltrimethoxysilane.

In the preferred variant 3, components a) and b) are comprised in the amounts specified below, and components c) to e) are not comprised:
a) 20 to 50 wt. %, preferably 20 to 40 wt. %, of polyisobutyl methacrylate or isobutyl methacrylate or a mixture thereof
b) 50 to 80 wt. % of butyl acrylate.

In the preferred variant 4, components a), b and c) are comprised in the amounts specified below, and components d) and e) are not comprised:
a) 20 to 50 wt. %, preferably 20 to 40 wt. %, of polyisobutyl methacrylate or isobutyl methacrylate or a mixture thereof
b) 30 to 75 wt. % of butyl acrylate
c) 5 to 50 wt. %, preferably 5 to 30 wt. %, of polybutyl acrylate.

In the preferred variants 1 to 4, the sum of the components included, from components a) to e), is 100 wt. %. Within each of the stated ranges, even without an explicit indication of limit values, the amounts of components a) to e) are freely variable, and so in this way the sum total of the above components a) to e) can be adjusted to 100 wt. %. The amount of butyl acrylate is preferably adapted in line with the mandated amounts of the other components. Further components may of course likewise be present, as described above, in the aforementioned particularly preferred compositions.

The formulas with components d) and/or e) are used preferably for cast polymerization. They can also be used for producing the adhesive sheet, but in that case corresponding amounts of chain transfer agents ought to be added, so that the material remains fluid.

In the preferred embodiments in which the addition of components d) and e) is omitted, the compositions preferably comprise at least 50 wt. % of butyl acrylate or 50 wt. % of a mixture of butyl acrylate and polybutyl acrylate.

In one specific embodiment of the present invention, only component e) is omitted. In the case of this variant it is preferred to use (meth)acrylic acid as component d).

The adhesive composition is used in accordance with the invention for producing laminates, preferably in order to bond a plastic element to a glass element. This can be done in a variety of ways.

In a variant A) it is possible to arrange a 1st element, preferably of glass, more preferably a glass plate, and a 2nd element, preferably of plastic, more preferably a plastics plate, in such a way that a cavity is formed between them, and then to fill this cavity with an adhesive composition of the invention, and to produce an adhesive layer. For this purpose, the adhesive composition may either be introduced as a melt or—as is preferred—introduced in the form of a polymerizable composition, and this melt or composition is then polymerized to completion.

In a variant B) it is possible first, from an adhesive composition of the invention, preferably in the form of a polymerizable composition, to produce a polymeric sheet, preferably having a thickness of 0.01 to 5 mm, preferably 0.1 to 3 mm and more preferably 0.3 to 2 mm, then to dispose this sheet between a 1st element, preferably of glass, more preferably a glass plate, and a 2nd element, preferably of plastic, more preferably a plastics plate, and then to carry out lamination under pressure and temperature.

In a variant C), the adhesive composition of the invention is used to join two elements to one another in a hot bonding process.

Where the adhesive composition of the invention is used in the form of a composition to be polymerized, that composition is first of all prepared. For this purpose, the reaction product from the reaction of the silicon compound of the formula (II) with water and/or acid is preferably mixed with the further components a) to d) and the mixture is usefully stirred until a homogeneous solution is obtained. The sequence of the additions in this case is not critical, but the monomers that are present in smaller amounts are preferably added to the predominant monomer or monomers.

The polymerizable compositions are reacted even without addition of initiator, their reactivity being dependent on the combination used. Where the formulations are to be used shortly after their production, there is no need to add an inhibitor. Their lifetime can also be substantially prolonged by storage with cooling. If longer storage is necessary or if they are to be despatched using standard channels of commerce, it is generally necessary to use polymerization inhibitors. Suitable inhibitors are vinyl polymerization preventatives such as tert-butylcatechol, hydroquinone, hydroquinone monoethyl ether and 2,5-di-tert-butylhydroquinone. The amounts that are necessary vary according to monomer composition and the storage conditions, but in general are situated in the range from 0.005 to 0.1 wt. %, based on the total weight of the composition.

In variant A) of the invention, the adhesive composition is introduced, for example, between a glass plate, preferably a thin glass plate, and a plastics plate, which are held correspondingly in a polymerization cell, and an adhesive layer is produced. This leads to laminates comprising a transparent adhesive layer between firmly joined glass window and plastics window.

The polymerization cells that can be used in accordance with the invention are not subject to any particular restrictions; instead, all of those known from the prior art can be employed. It is possible, for example, to use polymerization cells made from glass and/or from polished stainless-steel plates.

Although traces of oxygen are known usually to disrupt the polymerization and even to prevent it under certain circumstances, there is generally no need in the context of the present invention for the compositions of the invention—to be degassed prior to the polymerization—if polymerizable compositions are being used. Nevertheless, in accordance with one preferred embodiment of the present invention, the composition of the invention is degassed, in order to remove enclosed air bubbles and also dissolved oxygen. Moreover, the polymerization is preferably carried out in the absence of oxygen.

The polymerization temperature to be selected for the polymerization is obvious to the skilled person. It is determined primarily by the initiator or initiators selected and by the nature of initiation (thermal, by means of irradiation, etc.). It is known that the polymerization temperature may influence the product properties of a polymer. In the context of the present invention, therefore, polymerization temperatures in the range from 10.0° C. to 110.0° C., usefully in the range from 20.0° C. to 100.0° C., more particularly in the range from 20.0° C. to 90.0° C., are preferred. In one particularly preferred embodiment of the present invention, the reaction temperature is increased, preferably in stages, during the reaction. Furthermore, heating at elevated temperature, for example at 110° C., towards the end of the reaction has proven useful, especially if there is to be no photochemical aftercare.

In the case of adhesive bonding by means of the polymerizable composition, the thermal polymerization at a relatively high temperature opens up the possibility of moderately crosslinking the adhesive of the invention, in the presence of a sufficient fraction of butyl acrylate, and thereby of directly tailoring the flexibility and elasticity of the bond. An indicator of sufficient crosslinking is the loss of fluidity by the polymer, which is indicated, for example, by the loss of acetone solubility. Thermal polymerization is therefore a preferred embodiment for adhesive bonding via a polymerizable composition.

The conditions, especially pressure and polymerization time, are of course dependent especially on the choice of the initiator system. If photoinitiation only is selected, as the sole initiator system, then it is preferred to operate at a very low temperature and at atmospheric pressure. For the sake of simplicity, curing at room temperature is advisable; it is necessary to take into account the temperature within the adherend as a result of the heat of polymerization, as a function of the thickness of the layer of adhesive and as a function of the composition and reactivity of the adhesive composition. In the case of a relatively high fraction of the polymerizable components relative to the dissolved polymers, more heat of polymerization is released, as the skilled person is aware. The same applies to compositions having a relatively high fraction of more reactive (acrylate) monomers in the composition.

In the case of a thermal polymerization, the polymerization temperature is selected, depending on the decomposition temperature of the initiator system, in such a way that a moderate polymerization reaction takes place. In this case, account must be taken of the supply and removal of heat by the adherends that are in contact with the polymerizable mixture, and of the heat change caused by the composition of the polymerizable mixture, and also of the thickness of the layer of adhesive. The polymerization temperature is preferably selected such that the polymerization can take place at atmospheric pressure and no bubbles are formed in the polymer.

In variant A) it is particularly preferred first of all to carry out thermal curing of the polymerizable composition, preferably at 60 to 100° C. for 30 to 90 minutes, and subsequent curing to completion by means of UV radiation, preferably at 20 to 80° C., more preferably 20 to 40° C. One particularly suitable UV source is a UV run-through dryer with an iron-doped mercury vapour lamp at 90% lamp power with a power of 120 watts/cm, operated preferably with a rate of advance of 3 m/min and with 2 through-runs.

In variant B), a sheet is first produced from the adhesive composition. This may be done by methods that are known to the skilled person.

It is preferred in this case to introduce a polymerizable composition made up of components a) to e) and optionally of one or more thermal polymerization initiators and/or one or more photoinitiators, and also, optionally, a chain transfer agent, into polymerization chambers, and to carry out degassing for the purpose of removing the air bubbles incorporated by stirring, this degassing taking place in a vacuum drying cabinet, preferably for 60 minutes at 400 mbar. A chamber is composed, for example, of two outer glass windows (DIN A4), two inner PET sheets (DIN A4), a spacer bead running all round, and brackets to hold the shape.

For producing the polymer sheet, it is particularly preferred first to carry out thermal curing of the polymerizable composition, preferably at 60 to 90° C. for 30 to 90 minutes, and then to carry out curing by means of UV radiation, preferably at 20 to 80° C.

In an alternative preferred embodiment, curing takes place by UV radiation in a way which avoids excessive heat change (formation of bubbles). For this purpose, the polymerization chamber is run preferably with the liquid monomer-polymer syrup in 3 through-runs at 5 m/min, 3 through-runs at 4 m/min, 3 through-runs at 3 m/min and 3 through-runs at 2 m/min, through the UV polymerization unit specified under variant A). Completely clear and transparent polymers are obtained which are easy to remove from the PET sheets. Any homogeneities in layer thickness can be compensated without problems by pressing at 80° C. and at 30 to 100 kN depending on the molecular weight. Variants of higher molecular weight here require a higher pressing pressure than variants of low molecular weight.

With the adhesive compositions of the invention and/or the sheets produced from them it is possible to produce laminates having particularly good properties.

The laminates preferably have a thickness, of the adhesive layer, of 0.3 to 2 mm, more particularly in the range from 0.5 to 1 mm. Depending on the adhesive composition, the thickness may be important, since the elastic layer of adhesive is required to compensate thermal stresses arising as a result of differences in thermal expansion coefficient between plastic and glass, and the maximum permissible ongoing stress that can act on PMMA, for example, without damage, and as known to the skilled person, must not exceed a figure of 5 MPa. In line with the dimensions of the laminated window, therefore, the thickness and flexibility of the layer of adhesive are therefore set such that the stress of 5 MPa in the case of PMMA is not exceeded. Small windows therefore manage with a thinner layer of adhesive, whereas larger windows require a thicker layer in order to get below the maximum permissible stress. For reasons of weight, cost and design, the thickness of the layer of adhesive is set such that it is able to compensate all stresses within the service range between −40° C. and +80° C., but to be no thicker than necessary. In this way, success is achieved in obtaining particularly thin laminated windows with low weight and good resistance, with no tendency towards delamination under the required service conditions.

In order to be able to produce particularly lightweight laminates, it is especially preferred in accordance with the invention to use thin glass with a thickness of 0.01 to 2 mm, preferably 0.1 to 1.5 mm. The use of such thin glasses is possible in particular by virtue of the adhesive of the invention.

In accordance with the invention, glass denotes substances in an amorphous, non-crystalline solid state. The glass state can be interpreted in physicochemical terms as a frozen supercooled liquid or melt. Given a sufficiently high cooling rate for a melt, or given condensation of molecules from the vapour phase on to substrates subject to extreme cooling, virtually any substance can be converted in meta-stable form into the glass state. In the context of the present invention, glass refers in particular to inorganic, preferably oxidic, melting products which are converted into the solid state by an operation of freezing the melt-phase components without crystallization. Glasses particularly preferred in accordance with the invention encompass cooled melts which comprise silicon dioxide ($SiO_2$), calcium oxide (CaO), sodium oxide ($Na_2O$), with in some cases sizeable amounts of boron trioxide ($B_2O_3$), aluminium oxide ($Al_2O_3$), lead oxide (PbO), magnesium oxide (MgO), barium oxide (BaO) and/or potassium oxide ($K_2O$), more particularly silicon dioxide ($SiO_2$). For further details, reference is made to the familiar technical literature, as for example to CD Römpp Chemie Lexikon—Version 1.0, Stuttgart/New York; Georg Thieme Verlag; 1995; entry heading: Glass. Particular preference is given to silicate glass windows, for example soda-lime glass, low-iron white glass or particularly fracture-resistant, chemically prestressed glass, as sold for example under the brand name Gorilla-Glas from Corning or Xensation from Schott.

The laminates of the invention preferably have at least one plastics layer. This is preferably a plastics window with a thickness of 0.5 to 8 mm, preferably 1 to 4 mm. The thickness of the plastics window is important for obtaining, first, sufficient rigidity of the laminated window, secondly a minimal weight for the overall system, and, furthermore, good thermal and acoustic insulation.

Materials which can be used for the plastics window are transparent semi-finished plastics obtainable by extrusion or casting processes. Preference is given to using PMMA, polycarbonate, styrene copolymers, polyesters, transparent microcrystalline polyamide such as, for example, Trogamid CX from Evonik Industries, and especially PMMA.

In the selection of the plastics material, particular preference is given to those plastics which apart from a high transparency and low distortion are also notable for outstanding weathering resistance. The plastics may include a particularly effective UV protection and/or a transparent colouring; it is likewise possible, if required, to integrate an infrared-reflective or infrared-absorbing, a thermotropic or phototropic finish to the material.

In specific embodiments it is also possible, however, to use plastics with fillers, examples being PLEXIGLAS Mineral, wood-plastic composites (WPCs), or composites of plastic or of synthetic resin with inorganic filler or fibres, as plastics elements.

Preferred in accordance with the invention are laminates of plastic and glass. It will be appreciated, however, that the adhesives of the invention can also be used to bond glass to glass and plastic to plastic. Bonds of and with other materials, for example stone or metal, such as aluminium, aluminium alloys, steel, non-ferrous metals, woods, layered composite materials or ceramic are also possible.

Particularly preferred laminates are notable for comprising
  at least one plastics element, preferably a plastics plate, more preferably having a thickness of 0.5 to 8 mm, and very preferably consisting of a homopolymer or copolymer or of a polymer blend of poly(meth)acrylates,
  at least two further elements, preferably at least two glass panes, preferably having a thickness of 0.01 to 2 mm, and very preferably consisting of soda-lime glass or low-iron white glass or chemically prestressed glass,
  in each case between the plastics element and the glass panes, an adhesive layer composed of an adhesive composition according to any of Claims 1 to 5.

The layer sequence may be continued arbitrarily in the manner specified, to give multi-layer laminates having particularly stable properties.

In another particularly preferred embodiment, laminates may be produced from a glass window which is thick in relation to the polymer sheet, preferably 2 to 8 mm, more preferably 3 to 6 mm, as support for a polymer sheet which is affixed by means of adhesive of the invention and is preferably structured, more preferably a sheet with Fresnel structures. The laminates are produced for use in solar modules for concentrated photovoltaics. Examples of suitable structures are those known as Fresnel structures, which as a flat lens bundle the light from the sun. In this application the glass component used typically comprises solar glasses, which generally comprise low-iron white glass. The structured polymer sheet that is bonded may be a PMMA sheet with a structure formed directly in it. In another embodiment, a sheet with embossing provided via a structured coating applied to the sheet may also be employed.

In order to obtain particularly lightweight laminates, the individual plastics layers or glass layers may also be configured in partly hollow form. The hollow cavities may be evacuated or filled with inert gases.

The laminates of the invention can be used in all of the fields of application stated in the description of the prior art, especially windows, more particularly roof windows, safety glazing, vehicle glazing, car glazing, railways, ships, aircraft, helicopters, solar modules, anti-braking and ballistic-resistant glazing systems, displays, touch panels, glass houses and conservatories.

Measurement and Testing Methods:
a) Haze (ASTM D1003)
b) Light transmission (DIN EN 410)
c) Tensile strength (ISO 527-3/2/50), Part 3 sheets, specimens: 15 mm parallel strips, testing speed 50 mm/min, clamped-in length 50 mm
d) Elongation at break (ISO 527), conditions as for the determination of tensile strength
e) Shore hardness (ISO 868), Shore A,
f) DSC glass transition temperature, DIN EN 11357, Part 2, glass transition temperature, second heating cycle, heating rate 10° C./min,
g) Viscosity (DIN 3219), October 1994 version,
h) Shear strength (DIN EN 1465), 25 mm strip, overlapped length 10 mm, testing speed 5 mm/min.

The examples below serve for further illustration and improved understanding of the present invention, but do not restrict it in any way.

EXAMPLES

1. Hydrolysis of the Silane Component e)

10 g of gamma-methacryloyloxypropyltrimethoxysilane are weighed out with +0.4 g of methacrylic acid and 2 g of water and stirred. The initial result is formation of a turbid mixture. After about 2 hours, however, a clear solution emerges, and was used to produce the polymerizable compositions of the invention.

2. General Description of the Production of the Laminated Sheets

A polymerizable composition of the invention comprising
polyisobutyl methacrylate (Degalan P 26 from Evonik)
butyl acrylate
optionally polybutyl acrylate (Acronal 4F from BASF)
optionally glycidyl methacrylate
optionally the hydrolysed silane component from Example 1
a thermally activatable polymerization initiator, bis(4-tert-butylcyclohexyl)peroxydicarbonate
a photoinitiator, 2,4,6-trimethylbenzoyldiphenylphosphine oxide (Lucirin TPO)
is produced in accordance with the quantities stated in Tables 1 and 2 below, by simple mixing and stirring. In order to remove air bubbles incorporated by stirring, the reactive solutions, before being introduced into the polymerization chambers, are evacuated at room temperature in a vacuum drying cabinet at 400 mbar for 60 minutes.

The laminated sheets are produced by chamber polymerization.

Each chamber consists of a glass window (320×320×8 mm) and an extruded PMMA plate (PLEXIGLAS® 0A000) with the same dimensions (for thickness see datum in the examples below), inserted all round between which is a Teflon spacer bead approximately 2 mm thick. In order to ensure tightness after the reactive solution has been introduced, the chamber is provided with spring clamps.

The low-viscosity reactive solutions are introduced conventionally by means of a filling pouch.

The high-viscosity reactive solutions, in contrast, are introduced by pouring the reactive solution (approximately 200 g) without air bubbles on to a glass plate 32×32 cm. The Teflon strip adhered all round serves as an outer barrier here. The PMMA plate, 32×32 cm, is subsequently mounted laterally on the edge of the glass plate, and then slowly lowered downwards. The weight of the PMMA plate presses the solution outwards on all sides, and so virtually the entire chamber becomes filled. When the spring clamps have then been attached, the remaining part of the air is displaced as well, and so the chamber is then fully filled.

Polymerization takes place, finally, in a drying cabinet at 80° C. over the course of 60 minutes. The laminated sheets are subsequently aftercured at room temperature beneath a UV unit (UV through-run dryer, manufacturer: Print Concept, 120 watts/cm, iron-doped mercury vapour lamp) (2 through-runs each at 3 m/min, at 90% lamp power).

3. Determination of the Optical and Mechanical Properties of Laminated Glass Sheets and of the Rheological Properties of the Reactive Solution The laminated glass sheets A to I were produced in accordance with the general production instructions from Example 2 (glass window thickness: 4 mm). The compositions of the reactive solutions and also the optical and mechanical properties are reported in Table 1 below.

TABLE 1

| | Unit | A | B | C | D | E | F | G | H | I |
|---|---|---|---|---|---|---|---|---|---|---|
| a) Polyisobutyl methacrylate | | 20.00 | 20.00 | 30.00 | 40.00 | 50.00 | 40.00 | 30.00 | 40.00 | 40.00 |

TABLE 1-continued

|  | Unit | A | B | C | D | E | F | G | H | I |
|---|---|---|---|---|---|---|---|---|---|---|
| c) Acronal 4F | parts by weight | 20.00 | — | — | — | — | 20.00 | 10.00 | 10.00 | 10.00 |
| b) Butyl acrylate | parts by weight | 57.00 | 77.00 | 67.00 | 57.00 | 47.00 | 37.00 | 57.00 | 47.00 | 60.00 |
| d) Glycidyl methacrylate | parts by weight | 1.70 | 1.70 | 1.70 | 1.70 | 1.70 | 1.70 | 1.70 | 1.70 | — |
| e) Hydrolysed silane solution from Example 1 | parts by weight | 1.30 | 1.30 | 1.30 | 1.30 | 1.30 | 1.30 | 1.30 | 1.30 | — |
| 2,4,6-Trimethyl-benzoyl-diphenyl-phosphine oxide | parts by weight | 0.50 | 0.50 | 0.50 | 0.50 | 0.50 | 0.50 | 0.50 | 0.50 | 0.50 |
| Lucirin TPO | parts by weight | 0.50 | 0.50 | 0.50 | 0.50 | 0.50 | 0.50 | 0.50 | 0.50 | 0.50 |
| Performance tests on the laminated sheet | | | | | | | | | | |
| Light transmission | | | | | | | | | | |
| at 20° C. | [%] | 92.10 | 90.30 | 91.20 | 92.00 | 92.30 | 92.20 | 92.20 | 91.90 | 92.30 |
| at 80° C. | [%] | 92.10 | 90.00 | 91.30 | 92.00 | 92.30 | 91.30 | 92.20 | 91.90 | 92.30 |
| Haze | | | | | | | | | | |
| at 20° C. | [%] | 0.37 | 3.35 | 2.39 | 0.85 | 0.30 | 0.21 | 0.72 | 0.27 | 0.19 |
| at 80° C. | [%] | 0.43 | 3.40 | 2.44 | 0.89 | 0.59 | 0.84 | 0.72 | 0.36 | 0.44 |
| Tensile strength | [mPa] | 0.61 | 0.56 | 1.30 | 2.90 | 4.40 | — | 1.4 | 2.20 | 2.00 |
| Elongation at break | [%] | 182.10 | 222.40 | 249.70 | 291.50 | 282.00 | — | 235.8 | 417.8 | 736.20 |
| Shore hardness |  | 48.00 | 54.00 | 57.00 | 74.00 | 91.00 | — | 58.0 | 70.00 | 55.00 |
| Performance tests on the adhesive layer | | | | | | | | | | |
| Adhesive layer glass transition temperature | [° C.] | −39 | −40 | −35 | −33 | −31 |  | −37 | −30 | −32 |
| Performance tests on the reactive solution | | | | | | | | | | |
| Reactive solution viscosity before polymerization | [mPa*s] | 298 | 45 | 178 | 930 | 3410 |  | 560 | 1970 | 1930 |

The laminated glass/PMMA sheets according to Examples A to I consistently show good transparency (light transmission=90 to 92%) and low to very low haze (haze=3.5% to 0.2%). No effect can be found of the temperature on the clarity of the laminated sheets, and hence the adhesive of the invention can be employed very effectively even at high temperatures.

With regard to the mechanical properties, it is found that the tensile strength of the laminated layers is improved (from 0.56 MPa to 4.4 MPa) as the fraction of component a) goes up (20% to 50%). The laminated layers are flexible and exhibit rubber-like behaviour.

The glass transition temperature and the viscosity can be tailored through the polyisobutyl methacrylate and polybutyl acrylate fractions.

4. Determination of the Shear Strengths of Laminated Glass Sheets

The experiments were carried out with polymerizable compositions according to Examples A to I. In a modification relative to the stipulations in Table 1, however, the polymerizable compositions in Examples A* to C* here contained 1 wt. % each of the thermal initiator and the photoinitiator, and the polymerizable compositions in Examples D* to I* here contain 0.5 wt. % each of the thermal initiator and the photoinitiator. The thickness of the glass window was 5 mm.

It was found that the shear strength increases in Examples B* to E*, i.e. with increasing isobutyl methacrylate fraction (0.8 to 2.8 MPa*s). Replacing butyl acrylate by polybutyl acrylate has no significant consequences for the shear strength. A comparison of Examples D* and I* showed, however, that omitting the adhesion-promoting components d) and e) resulted in a reduction in shear strength from 2.5 MPa*s to 1.6 MPa*s. On the one hand this result demonstrates that sufficient shear strength is achievable even without the adhesion-promoting components; on the other hand, however, it also shows that by adding components d) and e) the shear strength can be specifically raised once again and therefore individually adapted.

5. Climatic Cycling Test

The objective of these experiments is to subject inventive and non-inventive laminated sheets to a climatic cycling test in order to discover whether and, if so, which laminated sheets withstand the associated temperature change (between −30° C. to +80° C.) without damage (without delamination, clouding and warping). A further intention is to test the possibility of employing thin glass sheets in the laminated sheets.

For implementing the climatic cycling test, further examples J to S were produced as follows. PMMA plates (PLEXIGLAS® 0A000) 4 mm thick were bonded to glass plates 1 mm thick to give laminated sheets. The laminated glass/PMMA sheets were produced by polymerization in a casting process. In this process, reactive solutions with the compositions as specified in Table 2 were introduced into chambers (300×200 mm) and polymerized thermally in a drying cabinet at 80° C. for 60 minutes. This was followed by curing to completion (UV polymerization) in a UV unit (UV run-through dryer, manufacturer: Print Concept, 120 watts/cm, iron-doped mercury vapour lamp) (2 through-runs at 3 m/min, at 90% lamp power).

The chambers used consisted of a PMMA (XT) plate 4 mm thick and a glass plate 1 mm thick, spaced apart by a Teflon bead 2 mm thick inserted all round. In order to prevent the thin glass sheet breaking during assembly of the chamber (the chamber is fixed using spring clamps), the thin glass sheet was additionally covered with a thicker glass sheet (4 mm).

Figure 1:
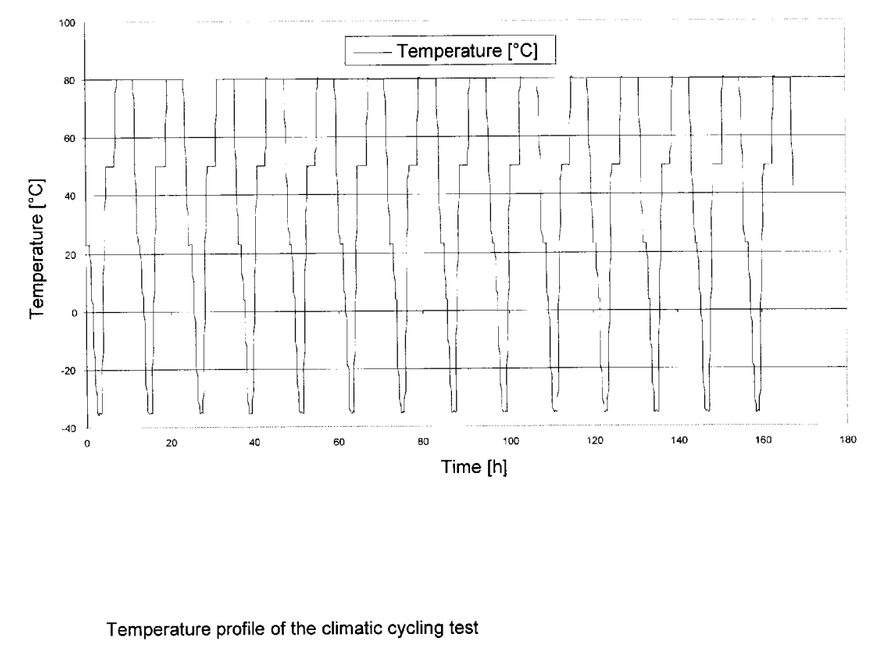

The cast laminated PMMA sheets were subsequently cut to the appropriate size (220×100 mm) for the climatic cycling test, using lasers, and were then subjected to the climatic cycling test (temperature profile: see FIG. 1).

The climatic cycling test was carried out in the range between +80° C. (temperature maximum) and −30° C. (temperature minimum), within a period of 7 days. During this time, the laminated sheets were thermally exposed to a total of 14 temperature changes.

dish-like warping in the course of cooling to room temperature, resulting ultimately in the glass breaking. Accordingly it was not possible to carry out the climatic cycling test.

6. Production of Laminated Systems of a Thick Solar Glass and a Thin PMMA Sheet by Chamber Polymerization with and without Component e)

In the same way as described in Example 2, laminated systems based on solar glass windows with an impact-modified PMMA sheet were produced in a casting process. The sheet used in the examples was unstructured, though it would be equally possible to use a structured sheet, with Fresnel structure, for example.

TABLE 2

| | Unit | J | K | L | M | N | O | P | Q | R | S | CE1 |
|---|---|---|---|---|---|---|---|---|---|---|---|---|
| a) Polyisobutyl methacrylate | parts by weight | 20.00 | 20.00 | 30.00 | 40.00 | 50.00 | 30.00 | 30.00 | 40.00 | 40.00 | 60.00 | — |
| c) Acronal 4F | parts by weight | 20.00 | — | — | — | — | 20.00 | 10.00 | 10.00 | 10.00 | — | — |
| b) Butyl acrylate | parts by weight | 57.00 | 77.00 | 67.00 | 57.00 | 47.00 | 47.00 | 57.00 | 47.00 | 50.00 | 37.00 | — |
| d) Glycidyl methacrylate | parts by weight | 1.70 | 1.70 | 1.70 | 1.70 | 1.70 | 1.70 | 1.70 | 1.70 | — | 1.70 | 1.70 |
| e) Hydrolysed silane solution from Example 1 | parts by weight | 1.30 | 1.30 | 1.30 | 1.30 | 1.30 | 1.30 | 1.30 | 1.30 | — | 1.30 | 1.30 |
| Bis(4-tert-butylcyclo-hexyl) peroxy-dicarbonate | parts by weight | 0.50 | 0.50 | 0.50 | 0.50 | 0.50 | 0.50 | 0.50 | 0.50 | 0.50 | 0.50 | — |
| Lucirin TPO | parts by weight | 0.50 | 0.50 | 0.50 | 0.50 | 0.50 | 0.50 | 0.50 | 0.50 | 0.50 | 0.50 | — |
| Additional components for CE 1 | | | | | | | | | | | | |
| MMA | parts by weight | — | — | — | — | — | — | — | — | — | — | 97 |
| 2,2'-Azobis(2,4-dimethyl-valeronitrile) | parts by weight | — | — | — | — | — | — | — | — | — | — | 0.01 |
| 2,2'-Azobis-isobutyro-nitrile | parts by weight | — | — | — | — | — | — | — | — | — | — | 0.03 |
| Performance tests | | | | | | | | | | | | |
| Haze | | | | | | | | | | | | |
| Before test at 20° C. | [%] | 1.26 | 1.17 | 0.9 | 0.89 | 0.91 | 1.07 | 1.8 | 0.81 | 0.71 | 1.43 | — |
| After test at 20° C. | [%] | 1.35 | 1.87 | 0.89 | 1.02 | 0.81 | 1.52 | 2.3 | 1.36 | 0.95 | 0.6 | — |

All of the samples passed the climatic cycling test. This is the case, surprisingly, even for sample R), without adhesion promoter components d) and e). All of the samples were unchanged (no delamination) after the climatic cycling test, and therefore exhibited high resistance to temperature change between −30° C. and +80°.

As far as the optical properties are concerned, no clear trend is evident from a comparison of the samples. With the individual samples, furthermore, it is also not possible to find any significant change in haze as a result of the climatic cycling test. Overall, however, the optical properties of the samples can be termed sufficiently good both before and after the climatic cycling test (see Table 2).

The situation, however, is different for the sample of Comparative Example CE1, which is very similar to the reactive solution stated explicitly in WO03078485A1. In this case, a PMMA-based laminated layer was used, which exhibited In a polymerization chamber, a solar glass window 2.95 mm thick (from Saint Gobain, Diamant Solar, manufacturer specification: 2.85 mm, 200×300 mm) and an impact-resistant PMMA sheet from Evonik Industries, with a thickness of 0.55 mm, were arranged such that they were spaced apart via a Teflon bead 2 mm thick (from Hecker) inserted all round. For reasons of stability, the PMMA sheet is provided with a 3 mm glass support plate (which does not subsequently become part of the assembly). The sheet is fixed at the side using adhesive film from Tesa. In order to ensure tightness after the reactive solution has been introduced, the chamber is provided with spring clamps.

Table 3 sets out the weight figures for the individual components, and the total batch amount. In accordance with the quantity figures in Table 3, the respective monomer-polymer solution is prepared by mixing and stirring individual components. Certain examples describe the additional use of component e), which is prepared first of all as a preliminary solution. Production is carried out as in Example 1 (hydrolysis of the silane component). In accordance with Table 3, a portion of this preliminary solution is added to the monomer-polymer solution.

In order to remove the air bubbles, the polymerizable compositions are evacuated in a vacuum drying cabinet at 400 mbar for 60 minutes before being introduced into the chambers. The low-viscosity polymerizable compositions were introduced in a conventional way, i.e. by means of a filling pouch. In contrast, the high-viscosity polymerizable compositions were introduced by pouring the polymerizable compositions, free from air bubbles, on to the glass plate, with the adhered Teflon strip serving as an outer barrier. The PMMA sheet, reinforced with the support plate, is subsequently mounted laterally at the edge of the solar glass plate, and then slowly lowered downwards. The subsequent application of pressure using spring clamps presses the remaining solution outwards and out of the chamber, and so the chamber thereafter is fully filled with no air bubbles.

The thermal polymerization takes place analogously in a drying cabinet at 80° C. over the course of 60 minutes. The laminated sheets are subsequently aftercured with the aid of a UV belt unit (UV run-through dryer, manufacturer: Print Concept, 120 watts/cm, iron-doped mercury vapour lamp) (2 through-runs each at 3 m/min, at 90% lamp power).

TABLE 3

Laminated systems of solar glass with PMMA sheet

| Designation of laminated system | T | U | V | X | Y | Z | AA | AB |
|---|---|---|---|---|---|---|---|---|
| Component a) Degalan P26 [g] | 30.0 | 30.0 | 45.0 | 60.0 | 16.6 | 16.6 | 24.9 | 33.2 |
| Component c) Acronal 4F [g] | 30.0 | — | — | — | 16.6 | — | — | — |
| Component b) Butyl acrylate [g] | 85.5 | 115.5 | 100.5 | 85.5 | 47.3 | 63.9 | 55.6 | 47.3 |
| Component d) Glycidyl methacrylate [g] | 2.55 | 2.55 | 2.55 | 2.55 | 1.41 | 1.41 | 1.41 | 1.41 |
| Component e) Hydrolysed silane solution from Example 1 [g] | 1.95 | 1.95 | 1.95 | 1.95 | — | — | — | — |
| Peroxycarboxylic ester [g] | 0.75 | 0.75 | 0.75 | 0.75 | 0.42 | 0.42 | 0.42 | 0.42 |
| Lucirin TPO [g] | 0.75 | 0.75 | 0.75 | 0.75 | 0.42 | 0.42 | 0.42 | 0.42 |
| Total batch [g] | 151.5 | 151.5 | 151.5 | 151.5 | 82.8 | 82.8 | 82.8 | 82.8 |

The laminated sheets obtained exhibited very good performance properties, as in the previous examples.

7. Production of Adhesive Sheets and Glass-Polymer Laminates Produced with Said Sheets Polymer sheets (adhesive sheets) are produced, based on polyisobutyl methacrylate (Degalan P26) with 0.5% bis(4-tert-butylcyclohexyl)peroxydicarbonate as initiator, with addition of 2-ethylhexyl thioglycolate as chain transfer agent, between PET sheet and outer aluminium support plates.

This is done by polymerizing polyisobutyl methacrylate solutions with various monomer compositions (see Table 4) between PET sheets to give adhesive sheets. Then laminated glasses comprising thin glass (1 mm) are produced with the above-produced adhesive sheets (DIN A4 format) and extruded PMMA plates (PLEXIGLAS 0A000, thickness=4 mm) by pressing at elevated temperature. For this purpose, the laminated sheets, placed together manually, are laminated under pressure (25 kN to 100 kN) at 100° C. (duration: 5 minutes) using a preheated press, after a heat-up time of 30 minutes.

Preparative Production of the Adhesive Sheets:

In a chamber made from two PET sheets (dimensions=600 mm×450 mm), with a 1.5 mm spacer bead of Teflon and with two outer support plates of aluminium (dimensions approximately 600 mm×450 mm), approximately 250 g of the polymerizable compositions as per Table 4 are polymerized in a drying cabinet at 80° C. for 60 minutes. Beforehand, in order to remove the air bubbles, the solution has been evacuated in a vacuum drying cabinet at 400 mbar for 60 minutes.

Where the polymerizable composition includes the photo-initiator as well as the thermal initiator, polymerization to completion is carried out subsequently by photochemical curing in a UV dryer from Print Concept at 2 m/min (3 through-runs at 2 m/min+3 through-runs at 3 m/min).

Lamination of the Glass-Polymer Laminates

The laminated sheets, placed together manually, are laminated at 100° C. (duration: 5 minutes) under pressure (25 kN to 100 kN) using a preheated press, after a heat-up time of 30 minutes.

TABLE 4

| Serial No. | Composition of adhesive sheet | Chain transfer agent [%] | Time [min] | Temp. [° C.] | Pressure [kN] |
| --- | --- | --- | --- | --- | --- |
| 7.1 | Polyisobutyl methacrylate (component a)/butyl acrylate (component b) = 50/50 | 0.50 | 5 | 100 | 25 |
| 7.2 | Polyisobutyl methacrylate (component a)/butyl acrylate (component b) = 50/50 | 0.05 | 5 | 100 | 100 |
| 7.3 | Polyisobutyl methacrylate (component a)/butyl acrylate (component b) = 30/70 | 0.05 | 5 | 100 | 25 |
| 7.4 | Polyisobutyl methacrylate (component a)/butyl acrylate (component b)/methacrylic acid (component d) = 40/59/1 | 0.10 | 5 | 100 | 50 |
| 7.5 | Polyisobutyl methacrylate (component a)/butyl acrylate (component b)/methacrylic acid (component d) = 40/58/2 | 0.10 | 5 | 100 | 50 |
| 7.6 | Polyisobutyl methacrylate (component a)/butyl acrylate (component b)/methacrylic acid (component d) = 40/59/1 | 0.25 | 5 | 100 | 25 |
| 7.7 | Polyisobutyl methacrylate (component a)/butyl acrylate (component b) = 50/50 | 0.25 | 5 | 100 | 25 |
| 7.8 | Polyisobutyl methacrylate (component a)/butyl acrylate (component b)/component d*)/component e*) = 50/47/1.7/1.3 | 0.75 | 5 | 100 | 25 |
| Comp. ex. | Commercial two-sided adhesive sheet, poly-2-ethylhexyl acrylate copolymer | crosslinked | 5 | 20 | 100 |
| 7.9 | P-i-BMA-MAA copol. (99/1) (component a)/butyl acrylate (component b)/methacrylic acid (component (d) = 40/59.4/0.6 | 0.25 | 5 | 100 | 50 |
| 7.10 | P-i-BMA-MAA copol. (98/2) (component a)/butyl acrylate (component b)/methacrylic acid (component c) = 40/58.8/1.2 | 0.25 | 5 | 100 | 75 |

Comp. d*: glycidyl methacrylate
Comp. e*: methacryloyloxypropyltrimethoxysilane
Chain transfer agent = ethylhexyl thioglycolate
P-i-BMA-MAA copol. = copolymer of isobutyl methacrylate and methacrylic acid The polybutyl acrylate used in the examples was Acronal 4F from BASF. This is a solvent-free polybutyl acrylate polymer of low molecular weight, which according to the technical data sheet has a glass transition temperature of −40° C. The molecular weight was found to be 21 000 g/mol. Other polybutyl acrylates could also be used, however.

As component a), Degalan P26 from Evonik Industries was used. According to the product data sheet for Degalan P26 (21 Mar. 2011), it is a methacrylate-based bead product based on isobutyl methacrylate, with a glass transition temperature of 66° C. according to DIN EN ISO 11357-1. The viscosity number according to DIN EN ISO 1628-1 is given as being 55 cm$^3$/g, the molecular weight Mw according to DIN 55672-1 as being 180 000 g/mol.

Example 8

Production Options for Polymer Component a)

In certain examples, copolymers of isobutyl methacrylate and methacrylic acid have been used as component a). These copolymers were obtained in the form of bead polymers by suspension polymerization as described below.

As well as the incorporation of adhesion-promoting comonomers such as methacrylic acid, for example, the molecular weight of the polymer component a) in the adhesive sheets can also be varied by the amount of chain transfer agent, which has consequences in turn for the resultant viscosity of the monomer-polymer solution to be subsequently prepared.

It has emerged, furthermore, that by advance shearing of the monomer-water dispersion during the suspension polymerization by means of an Ultra-Turrax or in-line shearing assembly (reference optionally to 200520023 and/or 200520035), finer polymer particles are obtained after polymerization has taken place, and these particles, depending on molecular weight, ought to lead to a shortened dissolution time.

Example 8.1

Variation in Molecular Weight Via Amount of Chain Transfer Agent

The molecular weight is varied by varying the amount of 2-ethylhexyl thioglycolate as chain transfer agent, using a Pickering stabilizer $Al(OH)_3$ in combination with the auxiliary dispersants sodium paraffinsulphonate and polyethylene glycol with a molecular weight Mw of approximately 5000 g/mol. The amount of chain transfer agent is given relative to the amount of monomer used. While the standard commercial product Degalan P26 has a viscosity number of 55 cm$^3$/g, it is likewise possible, by varying the amount of chain transfer agent, to set viscosity numbers of 67 or 33 cm$^3$/g. The resulting volume-average particle size d50 (also termed D[v,0.5] volume median diameter, D50 or D0.5) is determined by particle size determination on a Mastersizer 2000 from Malvern.

TABLE 5

| Example | Regulator % based on monomer (2-ethylhexyl thioglycolate) | Viscosity number [cm$^3$/g] | Amount of residual isobutyl methacrylate monomer [%] | Particle size V50 [µm] |
| --- | --- | --- | --- | --- |
| 8.1A | 0.22 | 55.4 | 0.34 | 146 |
| 8.1B | 0.15 | 66.9 | 0.49 | 147 |
| 8.1C | 0.5 | 32.6 | 0.33 | 156 |

Described Comprehensively Here is Example 8.1C:

A 2 L round-bottom flask apparatus with triangular stirrer, thermocouple, reflux condenser and water bath is charged with 956.0 g of water and 10.0 g of $Al_2(SO_4)_3 \times 14H_2O$, with stirring and with nitrogen blanketing. Using the water bath, this system is heated to 80° C. The stirring speed is 600 rpm=113 m/min (d=0.10 m). When the mandated internal temperature of 80° C. is reached, the sodium carbonate solution (44.0 g of 10% strength sodium carbonate solution, corresponding to 4.4 times the amount of the aluminium sulphate) is added in order to precipitate the aluminium trihydroxide. This is followed by addition of the auxiliary dispersants, sodium paraffinsulphonate and polyethylene glycol, in each case as a 1% strength solution (0.10 g of sodium paraffinsulphonate and 0.10 g of polyethylene glycol Mw approximately 5000 g/mol). The pH of the water phase is 5.5. Then the monomer phase is added, consisting of 500 g of isobutyl methacrylate containing 2.5 g of lauroyl peroxide and 2.5 g of 2-ethylhexyl thioglycolate (water to monomer ratio 2:1). Over the course of 82 minutes, the internal temperature rises from 80° C. to 83.8° C. After the temperature maximum, heating is continued at 90° C. for 1 hour in order to reduce residual monomers. This is followed by cooling to 40° C. and neutralization with 10 mL of 50% strength sulphuric acid. The batch is cooled further, drained off on a porcelain suction filter with a filter cloth, and washed with 10 L of distilled water. The bead product is dried (rack drying) at 35° C. for around 20 hours. This gives 466 g of bead product, which can be used for producing the adhesive sheets.

Example 8.2

Incorporation of Component d) as an Adhesion-Promoting Group into Component a)

Using a quantity of 0.25 wt. % of 2-ethylhexyl thioglycolate as chain transfer agent, based on the total monomer amount, it is possible to use bead polymers having adhesion-promoting groups in the form of carboxylic acid groups. As the amount of methacrylic acid in the monomer mixture goes up, a switch is made from the Pickering stabilizer produced in situ, $Al(OH)_3$, to a polyacrylic acid dispersant, a product traded as Degapas 8105S by Evonik Industries, Mw=400 000 g/mol. The ratio of water to monomer phase here is 3:1.

TABLE 6

| Example | Amount of isobutyl methacrylate in monomer mixture [wt. %] | Amount of methacrylic acid in monomer mixture [wt. %] | Dispersant amount in wt. % based on total monomer amount |
| --- | --- | --- | --- |
| 8.2A | 99 | 1 | 4.0 $Al_2(SO_4)_3 \times 14H_2O$ |
| 8.2B | 98 | 2 | 0.7 Degapas 8105 S |
| 8.2C | 97 | 3 | 0.7 Degapas 8105 S |
| 8.2D | 96 | 4 | 0.7 Degapas 8105 S |

Described Comprehensively Here is Example 8.2D:

A 2 L round-bottom flask apparatus with triangular stirrer, thermocouple, reflux condenser and water bath is charged with 1050.0 g of water and 2.45 g of Degapas 8105S, corresponding to 0.7 wt. %, based on the total monomer amount, and also 0.07 g of $KHSO_4$ (0.02 wt. % based on the total monomer amount) and 0.105 g of $MgSO_4$ (0.03 wt. % based on the total monomer amount), with stirring and with nitrogen blanketing. Using the water bath, this system is heated to 80° C. The stirring speed is 600 rpm=113 m/min (d=0.06 m). When the mandated internal temperature of 80° C. is reached, the monomer solution, consisting of 336.0 g of isobutyl methacrylate, 14.0 g of methacrylic acid, 1.75 g of lauroyl peroxide and 0.88 g of 2-ethylhexyl thioglycolate, was added (water to monomer ratio 3:1). Over the course of 70 minutes, the internal temperature rises from 80° C. to 84.7° C. After the temperature maximum, heating is continued at 85° C. for 1 hour in order to reduce residual monomers. This is followed by cooling to 30° C. The batch is first filtered through a wire sieve, after which the product is washed with 5 L of deionized water on a porcelain suction filter with filter cloth. The bead product is dried (rack drying) at 35° C. over for around 20 hours. This gives 330 g of bead product.

Example 8.3

Reducing the Particle Size

By shearing the monomer-water dispersion using an Ultra-Turrax prior to polymerization, it is possible to generate fine monomer droplets which are stabilized by the $Al(OH)_3$ dispersant. In the course of the subsequent polymerization, polyisobutyl methacrylate particles are obtained which have a weight-average particle size V50 of 97 µm for a viscosity number of 48 cm³/g (in comparison to the V50 bead sizes of 146-156 µm in Example 8.1, which are significantly larger). It is therefore also possible to generate finer particle sizes, which are of advantage in terms of time during the preparation of the monomer-polymer solutions, since these particles are more quickly wetted.

A 1 L Schmizo reactor with blade stirrer, thermocouple, reflux condenser and water bath is charged with 478.0 g of water and 5.0 g of $Al_2(SO_4)_3 \times 14H_2O$, with stirring and nitrogen blanketing. The stirring speed is 600 rpm=113 m/min (d=0.10 m). When the mandated internal temperature of 80° C. is reached, the sodium carbonate solution (22.0 g of 10% strength sodium carbonate solution, corresponding to 4.4 times the amount of the aluminium sulphate) is added to precipitate the aluminium trihydroxide. This is followed by the addition of the auxiliary dispersants, sodium paraffinsulphonate and polyethylene glycol, in each case as a 1% strength solution (0.05 g of sodium paraffinsulphonate and 0.05 g of polyethylene glycol Mw about 5000 g/mol). The pH of the water phase is 5.3. Then the monomer phase is added, consisting of 250 g of isobutyl methacrylate containing 1.25 g of lauroyl peroxide and 0.63 g of 2-ethylhexyl thioglycolate (water to monomer ratio 2:1). The contents of the reactor are sheared using an Ultra-Turrax from Ika T50 with S50-N-G45-MF shearing tool at 7000 rpm for 10 minutes. Over the course of 120 minutes, the internal temperature rises from 76° C. to 80° C. After the temperature maximum, heating is continued at 90° C. for an hour in order to reduce residual monomers. This is followed by cooling to 40° C. and by neutralization using 10 ml of 50% strength sulphuric acid. The batch is cooled further, drained off on a porcelain suction filter with a filter cloth, and washed with 10 L of distilled water. The bead product is dried (rack drying) at 35° C. for around 20 hours. This gives 225 g of bead product.

The invention claimed is:

1. An adhesive composition suitable for producing a laminate, comprising:
   a) from 10 to 60 wt. % of polyisobutyl methacrylate, isobutyl methacrylate or a mixture thereof,
   b) from 0 to 80 wt. % of butyl acrylate,
   c) from 0 to 50 wt. % of polybutyl acrylate,
   d) from 0 to 5 wt. % of at least one (meth)acrylate of the formula (I):

where X=O or N, $R^3$ is a hydrogen atom or a methyl group, and $R^4$ denotes an aliphatic or cycloaliphatic radical having from 1 to 20 carbon atoms that has at least one hydroxyl group, thiol group, primary amino group, secondary amino group, and/or an epoxy group, and
   e) from 0 to 5 wt. % of at least one silicon compound obtained by reacting 0 to 5 parts by weight of at least one silicon compound of the formula (II):

$$Si_m R^1_n R^2_o O_r X_s \qquad (II)$$

where
   $R^1$ independently at each occurrence denotes an alkenyl or cycloalkenyl radical having from 2 to 12 carbon atoms that may have one or more ester groups,
   $R^2$ independently at each occurrence denotes an alkyl or cycloalkyl radical having from 1 to 12 carbon atoms,
   X independently at each occurrence represents a halogen atom or an alkoxy group having from 1 to 6 carbon atoms,
   m is an integer greater than or equal to 1,
   n is an integer between 1 and 2*m+1,
   o is an integer between 0 and 2*m,
   r is an integer between 0 and m−1,
   s is an integer between 1 and 2*m+1, and
   where in, n, o and s satisfy the relation (1):

$$n+o+s=2*m+2 \qquad (1)$$

with from 0.01 to 2 parts by weight of water and from 0 to 4.0 parts by weight of at least one acid,
   where components a) to e) total 100 wt. % and b) and c) comprise from 30 to 90 wt. %, based on the sum total of components a) to e).

2. The adhesive composition according to claim 1, further comprising a polymerization initiator.

3. The adhesive composition according to claim 1, wherein said composition comprises
   a) from 20 to 50 wt. %, of polyisobutyl methacrylate, isobutyl methacrylate or a mixture thereof,
   b) from 44 to 79 wt. % of butyl acrylate,
   c) 0 wt. % of polybutyl acrylate,
   d) from 0.5 to 3 wt. %, of (meth)acrylate or epoxy-functional (meth)acrylate, and
   e) from 0.5 to 3 wt. %, of vinylic and/or (meth)acryloyl-substituted trialkoxysilanes, or gamma-methacryloyloxypropyltrimethoxysilane
   or
   a) from 20 to 50 wt. %, of polyisobutyl methacrylate, isobutyl methacrylate, or a mixture thereof,
   b) from 24 to 79 wt. % of butyl acrylate,
   c) from 5 to 50 wt. %, of polybutyl acrylate,
   d) from 0.5 to 3 wt. %, of (meth)acrylate, epoxy-functional (meth)acrylate, or glycidyl methacrylate, and
   e) from 0.5 to 3 wt. %, of vinylic and/or (meth)acryloyl-substituted trialkoxysilanes, or gamma-methacryloyloxypropyltrimethoxysilane
   or
   a) from 20 to 50 wt. %, of polyisobutyl methacrylate, isobutyl methacrylate, or a mixture thereof, and
   b) 50 to 80 wt. % of butyl acrylate
   or
   a) from 20 to 50 wt. %, of polyisobutyl methacrylate, isobutyl methacrylate, or a mixture thereof,
   b) from 30 to 75 wt. % of butyl acrylate, and
   c) from 5 to 50 wt of polybutyl acrylate,
   where, the sum total of the components present, from components a) to e), is 100 wt. %.

4. A method for producing a laminate, comprising:
   melting the adhesive composition according to claim 1, and joining a first element and a second element to be bonded to one another by melt-bonding thereby producing the laminate or the glazing.

5. A method for producing a laminate, comprising:
forming a cavity between a first element comprising glass and/or a glass plate, and a second element, comprising plastic and/or a plastic plate,
said cavity is formed with a distance of the first element from the second element of 0.01 to 5 mm, and either
filling said cavity with the adhesive composition of claim 1 in melted form thereby producing the laminate,
or filling said cavity with the adhesive composition of claim 1 in the form of a polymerizable composition, and polymerizing the polymerizable composition thereby producing the laminate.

6. The method according to claim 5,
wherein all the polymerizable composition is first cured thermally, at from 70 to 110° C. for 30 to 90 minutes, and then is cured by UV radiation, at from 20 to 80° C.

7. A method for producing a laminate, comprising
placing a polymer sheet having a thickness of from 0.01 to 5 mm, produced from an adhesive composition according to claim 1 between a first element, comprising a glass element or a glass plate, and a second element, comprising aplastic element or a plastic plate, and
exposing said sheet to pressure and temperature thereby producing the laminate.

8. The method according to claim 7,
wherein during lamination the temperature is held in the range from 60 to 120° C. and/or the pressure is held in the range from 10 to 150 kN and/or the pressing time is from 1 to 100 minutes.

9. The method according to claim 7,
wherein the poly er sheet is produced using the adhesive composition in the form of a polymerizable composition, and the polymerizable composition is first cured thermally at from 60 to 110° C. for 30 to 90 minutes, and then is cured by UV radiation at from 20 to 80° C.

10. A polymer sheet, having a thickness of from 0.01 to 5 mm, obtained from an adhesive composition according to claim 1, such that the adhesive composition is present in the form of a polymerizable composition and is cured by polymerization.

11. A laminate comprising an adhesive layer comprising the adhesive composition of claim 1.

12. The laminate according to claim 11, further comprising at least one plastic element, comprising a plastic plate,
at least two further elements, comprising at least two glass panes, and
between the plastic element and the glass panes, an adhesive layer comprising the adhesive composition.

13. The laminate according to claim 11,
further comprising a support which comprises a glass plane which is thicker than the polymer film and a polymer sheet which is fixed with an adhesive of the invention, and is a sheet having Fresnel structures.

14. A laminate comprising an adhesive layer comprising the adhesive sheet according to claim 10.

15. The composition according to claim 1, which further comprises at least one additive selected from the group consisting of polymerization initiators, photoinitiators, impact modifiers UV stabilizers, UV absorbers, sterically hindered amines, wetting agents, dispersing additives, antioxidants, and chain transfer agents.

16. The adhesive composition according to claim 2, wherein the polymerization initiator is
a thermal initiator, selected from the group consisting of tert-amyl peroxyneodecanoate, tert-amyl peroxypivalate, tert-butyl peroxypivalate, t-amyl peroxy-2-ethylhexanoate, tert-butyl peroxy-2-ethylhexanoate, tert-amyl peroxy-3,5,5-trimethylhexanoate, ethyl 3,3-di(tert-amyl peroxy)butyrate, tert-butyl perbenzoate, tert-butyl hydroperoxide, decanoyl peroxide, lauryl peroxide, dibenzoyl peroxide, bis(4-tert-butylcyclohexyl)peroxydicarbonate, tert-butyl peroxyneodecanoate tert-butyl peroxy-3,5,5-trimethylhexanoate, and mixtures thereof,
and/or
a photoinitiator, selected from the group consisting of benzophenone, α,α-diethoxyacetophenone, 4,4-diethylaminobenzophenone, 2,2 dimethoxy-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl o-benzoylbenzoate, benzoin, benzoin ethyl ether, benzoin isopropyl ether, benzoin isobutyl ether, 2-hydroxy-2-methyl 1-phenylpropan-1-one, 2-isopropylthioxanthone, dibenzosuberone, 2,4,6-trimethylbenzoyldiphenylphosphine oxide, ethyl 2,4,6-trimethylbenzoylphenylphosphinate bisacylphosphine oxide, and mixtures thereof.

17. The composition according to claim 1, wherein components a)-e) are in polymerizable form.

18. The composition according to claim 1, wherein components a)-e) are in polymerized form.

19. The composition according to claim 1, which further comprises from 0.1 to 6 wt. %, based on the total weight of the composition, of further additives different from components a) to e).

20. The adhesive composition according to claim 1, wherein at least 10 wt. % of components a)-e) are in polymerized form, based on the total amount of components a)-e).

21. The adhesive composition according to claim 1, which comprises a copolymer comprising a) and d) and/or b) and d) in polymerized form.

22. The method according to claim 4, wherein the first element is glass and the second element is plastic.

* * * * *